(12) United States Patent
Yamaguchi et al.

(10) Patent No.: US 12,032,796 B2
(45) Date of Patent: Jul. 9, 2024

(54) DETECTION DEVICE HAVING PERIPHERAL DETECTION ELECTRODES

(71) Applicant: Japan Display Inc., Tokyo (JP)

(72) Inventors: Hiroshi Yamaguchi, Tokyo (JP); Naoki Takada, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/108,389

(22) Filed: Feb. 10, 2023

(65) Prior Publication Data

US 2023/0297198 A1  Sep. 21, 2023

(30) Foreign Application Priority Data

Feb. 15, 2022 (JP) .................. 2022-021330

(51) Int. Cl.
*G06F 3/044* (2006.01)
*G06F 3/041* (2006.01)

(52) U.S. Cl.
CPC .......... *G06F 3/0446* (2019.05); *G06F 3/0443* (2019.05); *G06F 3/0448* (2019.05); *G06F 3/04166* (2019.05)

(58) Field of Classification Search
CPC .................................................. G06F 3/0446

USPC ......................................................... 345/173
See application file for complete search history.

(56) References Cited

U.S. PATENT DOCUMENTS

| 10,747,377 | B2 | 8/2020 | Teranishi et al. | |
|---|---|---|---|---|
| 11,474,629 | B2 | 10/2022 | Teranishi et al. | |
| 2018/0284922 | A1* | 10/2018 | Teranishi | G06F 3/0412 |
| 2019/0324584 | A1* | 10/2019 | Son | G06F 3/0412 |
| 2023/0004249 | A1 | 1/2023 | Teranishi et al. | |

FOREIGN PATENT DOCUMENTS

JP  2018-169680 A  11/2018

* cited by examiner

*Primary Examiner* — Long D Pham
(74) *Attorney, Agent, or Firm* — K&L Gates LLP

(57) ABSTRACT

A detection device includes a plurality of first detection electrodes disposed in a matrix of rows and columns in a detection region of a substrate, at least one second detection electrode disposed in a peripheral region outside the detection region, positioned adjacent to some of the plurality of the first detection electrodes, and provided along a side of the detection region, and a coordinate calculation circuit configured to calculate a detection position of a detection target body.

15 Claims, 16 Drawing Sheets

FIG.12

CORRECTION TABLE 1 OF DETECTION VALUE OF SECOND DETECTION ELECTRODE

| POSITION OF DETECTION TARGET BODY (FIRST DETECTION ELECTRODE) | CORRECTION-TARGETED ELECTRODE (SECOND DETECTION ELECTRODE) | FIRST CORRECTION VALUE [$\gamma s$] | SECOND CORRECTION VALUE [$\gamma p$] |
|---|---|---|---|
| 33-1 | 34-1 | fs1 / S1-1(max) | fp1 / S1-1(max) |
| 33-2 | 34-1 | fs1 / S1-2(max) | fp1 / S1-2(max) |
| 33-3 | 34-1 | fs1 / S1-3(max) | fp1 / S1-3(max) |
| 33-13 | 34-2 | fs2 / S1-13(max) | fp2 / S1-13(max) |
| 33-14 | 34-2 | fs2 / S1-14(max) | fp2 / S1-14(max) |
| 33-15 | 34-2 | fs2 / S1-15(max) | fp2 / S1-15(max) |

FIG.13

CORRECTION TABLE 2 OF DETECTION VALUE OF SECOND DETECTION ELECTRODE

| POSITION OF DETECTION TARGET BODY (FIRST DETECTION ELECTRODE) | CORRECTION-TARGETED ELECTRODE (SECOND DETECTION ELECTRODE) | FIRST CORRECTION VALUE [$\gamma s$] | SECOND CORRECTION VALUE [$\gamma p$] |
|---|---|---|---|
| 33-1 | 34-3 | fs3 / S1-1(max) | fp3 / S1-1(max) |
| 33-4 | 34-3 | fs3 / S1-4(max) | fp3 / S1-4(max) |
| 33-7 | 34-3 | fs3 / S1-7(max) | fp3 / S1-7(max) |
| 33-10 | 34-3 | fs3 / S1-10(max) | fp3 / S1-10(max) |
| 33-13 | 34-3 | fs3 / S1-13(max) | fp3 / S1-13(max) |
| 33-3 | 34-4 | fs4 / S1-3(max) | fp4 / S1-3(max) |
| 33-6 | 34-4 | fs4 / S1-6(max) | fp4 / S1-6(max) |
| 33-9 | 34-4 | fs4 / S1-9(max) | fp4 / S1-9(max) |
| 33-12 | 34-4 | fs4 / S1-12(max) | fp4 / S1-12(max) |
| 33-15 | 34-4 | fs4 / S1-15(max) | fp4 / S1-15(max) |

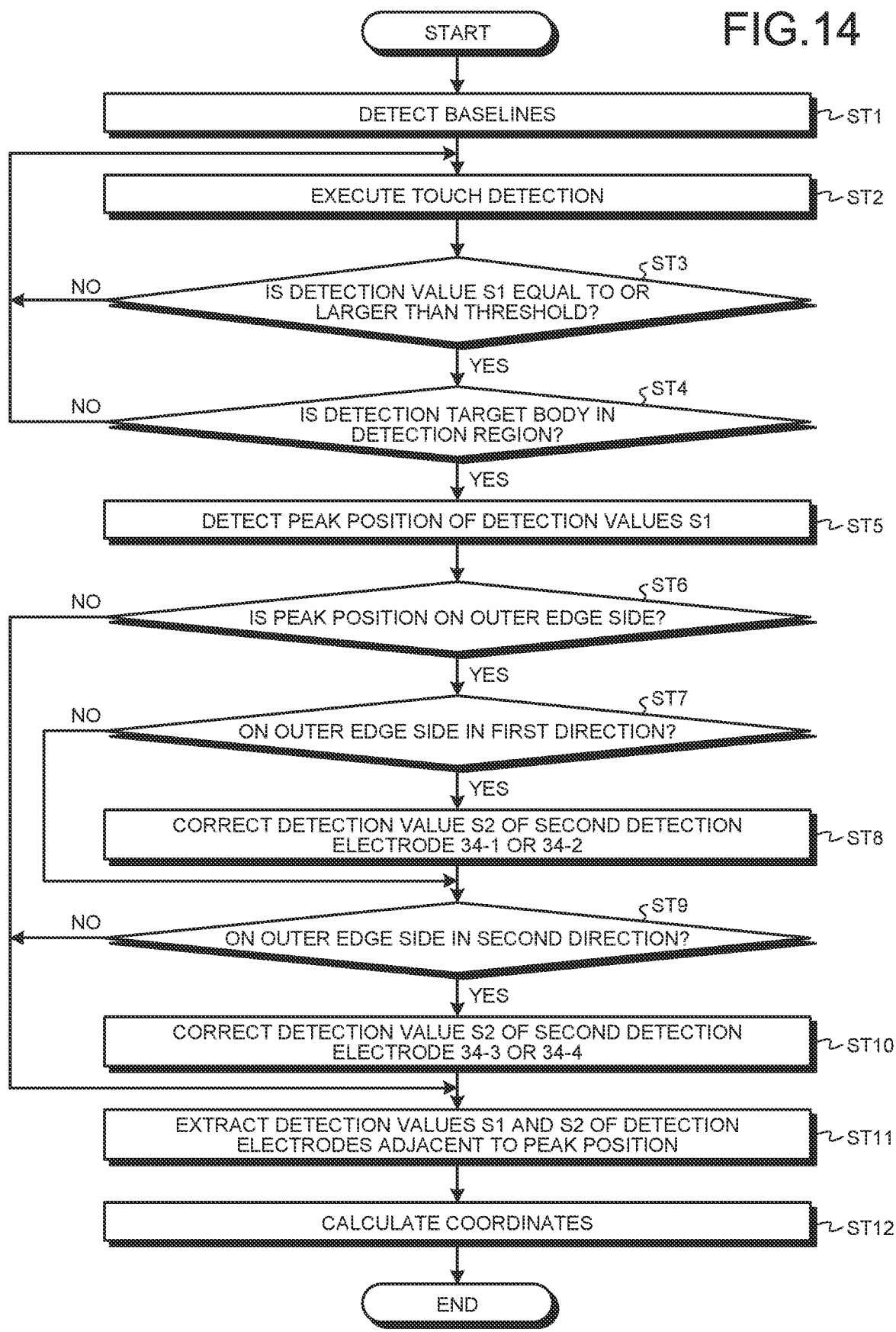

DETECTION DEVICE HAVING PERIPHERAL DETECTION ELECTRODES

CROSS-REFERENCE TO RELATED APPLICATION

This application claims the benefit of priority from Japanese Patent Application No. 2022-021330 filed on Feb. 15, 2022, the entire contents of which are incorporated herein by reference.

BACKGROUND

1. Technical Field

The present disclosure relates to a detection device.

2. Description of the Related Art

For example, a touch panel has been known as a sensor configured to detect whether a detection target body such as a finger is in contact or nearby (refer to Japanese Patent Application Laid-open Publication No. 2018-169680 (JP-A-2018-169680)). In a display device disclosed in JP-A-2018-169680, a plurality of detection electrodes are provided both in a detection region (referred to as a display region in JP-A-2018-169680) and a peripheral region, and touch detection can be performed in the peripheral region as well as in the detection region.

In JP-A-2018-169680, the detection electrodes in the peripheral region have different areas and shapes from those of the detection electrodes in the detection region. Thus, the accuracy of the detection position of a detection target body is potentially lower on an outer edge side of the detection region.

The present disclosure is intended to provide a detection device that can have improved accuracy of the detection position of a detection target body on an outer edge side of a detection region.

SUMMARY

A detection device according to an embodiment of the present disclosure includes a plurality of first detection electrodes disposed in a matrix of rows and columns in a detection region of a substrate, at least one second detection electrode disposed in a peripheral region outside the detection region, positioned adjacent to some of the plurality of the first detection electrodes, and provided along a side of the detection region, and a coordinate calculation circuit configured to calculate a detection position of a detection target body. When any of the first detection electrodes is disposed between a first detection electrode indicating a maximum detection value among the first detection electrodes and a side closest to the first detection electrode indicating the maximum detection value among sides of the detection region, the coordinate calculation circuit calculates the detection position of the detection target body based on the detection value of the first detection electrode indicating the maximum detection value and detection values of some first detection electrodes adjacent to the first detection electrode indicating the maximum detection value, among the plurality of first detection electrodes, and when the first detection electrode indicating the maximum detection value is disposed on an outer edge side of the detection region, the coordinate calculation circuit calculates the detection position of the detection target body based on the detection value of the first detection electrode indicating the maximum detection value, a detection value of the at least one second detection electrode adjacent to the first detection electrode indicating the maximum detection value, and detection values of some first detection electrodes adjacent to the first detection electrode indicating the maximum detection value, among the plurality of first detection electrodes.

A detection device according to an embodiment of the present disclosure includes a plurality of first detection electrodes disposed in a matrix of rows and columns in a detection region of a substrate, and at least one second detection electrode disposed in a peripheral region outside the detection region, positioned adjacent to some of the plurality of first detection electrodes, and provided along a side of the detection region. When a first detection electrode indicating a maximum detection value among the plurality of first detection electrodes is disposed on an outer edge side of the detection region, a detection position of the detection target body is calculated based on the detection value of the first detection electrode indicating the maximum detection value, a detection value of the at least one second detection electrode adjacent to the first detection electrode indicating the maximum detection value, and detection values of some first detection electrodes adjacent to the first detection electrode indicating the maximum detection value, among the plurality of first detection electrodes.

BRIEF DESCRIPTION OF THE DRAWINGS

FIG. 12 is a table illustrating an exemplary correction table of the detection value of a second detection electrode;

FIG. 13 is a table illustrating an exemplary correction table of the detection value of a second detection electrode;

FIG. 14 is a flowchart for description of a detection method by the detection device according to the embodiment;

DETAILED DESCRIPTION

Aspects (embodiments) of the present disclosure will be described below in detail with reference to the accompanying drawings. Contents described below in the embodiments do not limit the present disclosure. Components described below include those that could be easily thought of by the skilled person in the art and those identical in effect. Components described below may be combined as appropriate. What is disclosed herein is merely exemplary, and any modification that could be easily thought of by the skilled person in the art as appropriate without departing from the gist of the present disclosure is contained in the scope of the present disclosure. For clearer description, the drawings are schematically illustrated for the width, thickness, shape, and the like of each component as compared to an actual aspect in some cases, but the drawings are merely exemplary and do not limit interpretation of the present disclosure. In the present disclosure and drawings, any element same as that already described with reference to an already described drawing is denoted by the same reference sign, and detailed description thereof is omitted as appropriate in some cases.

In the present specification and the claims, an expression with "on" in description of an aspect in which one structural body is disposed on another structural body includes both a case in which the one structural body is directly disposed on the other structural body in contact and a case in which the one structural body is disposed above the other structural body with still another structural body interposed therebetween, unless otherwise stated in particular.

EMBODIMENT

Figure 1:
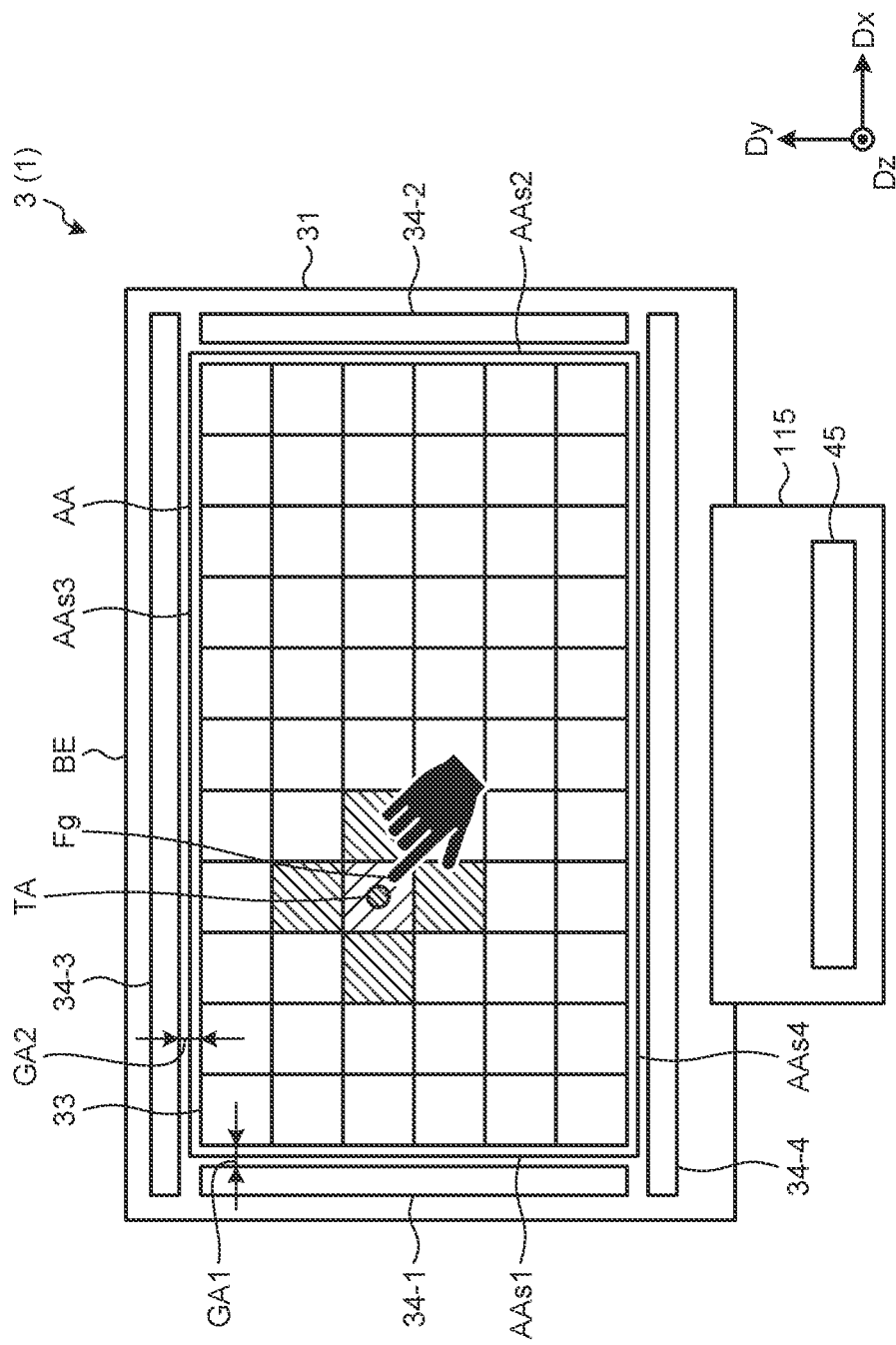
FIG. 1 is a plan view schematically illustrating a detection device according to an embodiment.

FIG. 1 is a plan view schematically illustrating a detection device according to an embodiment. As illustrated in FIG. 1, this detection device 3 includes a substrate 31, a plurality of first detection electrodes 33, a plurality of second detection electrodes 34-1, 34-2, 34-3, a wiring substrate 115, and a detection integrated circuit (IC) 45. The detection device 3 is a self-capacitive touch detection device. The detection device 3 can perform detection (hereinafter referred to as touch detection) of a detection target body Fg contacting a detection surface and position and motion detection (hereinafter referred to as hover detection) of the detection target body Fg when not contacting the detection surface. In the following description, the touch detection and the hover detection are collectively referred to as touch detection in some cases when not needed to be distinguished from each other.

The detection device 3 includes a detection region AA and a peripheral region BE outside the detection region AA. The detection region AA is a region in which the plurality of first detection electrodes 33 are provided and is a region for detecting the detection target body Fg such as a contacting or nearby finger. The detection region AA has a rectangular shape with four sides AAs1, AAs2, AAs3, and AAs4. The peripheral region BE is a region in which the plurality of first detection electrodes 33 are not provided and is a region between each of the four sides AAs1, AAs2, AAs3, and AAs4 of the detection region AA and the outer periphery of the substrate 31.

In the following description, a first direction Dx is an in-plane direction parallel to the substrate 31. A second direction Dy is another in-plane direction parallel to the substrate 31 and orthogonal to the first direction Dx. The second direction Dy may intersect the first direction Dx instead of being orthogonal thereto. A third direction Dz is orthogonal to the first direction Dx and the second direction Dy and is the normal direction of the principal surface of the substrate 31. A "plan view" illustrates a positional relation when viewed in a direction orthogonal to the substrate 31.

The plurality of first detection electrodes 33 are disposed in a matrix of rows and columns in the detection region AA of the substrate 31. In other words, the plurality of first detection electrodes 33 are arrayed in the first direction Dx and the second direction Dy. The plurality of first detection electrodes 33 are electrically coupled to the detection IC 45 through wires (not illustrated).

The plurality of second detection electrodes 34-1, 34-2, 34-3, and 34-4 are provided in the peripheral region BE on the substrate 31. In the following description, the plurality of second detection electrodes 34-1, 34-2, 34-3, and 34-4 are collectively referred to as second detection electrodes 34 in some cases when not needed to be distinguished from one another.

The plurality of second detection electrodes 34-1, 34-2, 34-3, and 34-4 are disposed around the plurality of first detection electrodes 33 provided in the detection region AA. More specifically, the second detection electrode 34-1 extends in the second direction Dy along the side AAs1 of the detection region AA. The second detection electrode 34-2 extends in the second direction Dy along the side AAs2 of the detection region AA. The detection region AA and the plurality of first detection electrodes 33 are provided between the second detection electrodes 34-1 and 34-2 adjacent to each other in the first direction Dx.

The second detection electrode 34-3 extends in the first direction Dx along the side AAs3 of the detection region AA. The second detection electrode 34-4 extends in the first direction Dx along the side AAs4 of the detection region AA. The detection region AA and the plurality of first detection electrodes 33 are provided between the second detection electrodes 34-3 and 34-4 adjacent to each other in the second direction Dy. The plurality of second detection electrodes 34 are electrically coupled to the detection IC 45 through wires (not illustrated).

The second detection electrodes 34-1, 34-2, 34-3, and 34-4 are each disposed adjacent to the plurality of first detection electrodes 33 arrayed along a corresponding one of the sides AAs1, AAs2, AAs3, and AAs4 of the detection region AA. Each second detection electrode 34 has an area and a shape different from those of each first detection electrode 33. The length of each second detection electrode 34 is longer than the length of each first detection electrode 33 in the extension direction of the second detection electrode 34. The width of each second detection electrode 34 is shorter than the width of each first detection electrode 33 in a direction intersecting the extension direction of the second detection electrode 34.

Specifically, the length of each of the second detection electrodes 34-1 and 34-2 in the second direction Dy, which extend in the second direction Dy, is longer than the length of each first detection electrode 33 in the second direction Dy. The width of each of the second detection electrodes 34-1 and 34-2 in the first direction Dx intersecting the extension direction thereof is shorter than the width of each first detection electrode 33 in the first direction Dx. The length of each of the second detection electrodes 34-3 and 34-4 in the first direction Dx, which extend in the first direction Dx is longer than the length of each first detection electrode 33 in the first direction Dx. The width of each of the second detection electrodes 34-3 and 34-4 in the second direction Dy intersecting the extension direction thereof is shorter than the width of each first detection electrode 33 in the second direction Dy.

The time constant of each second detection electrode 34 is equivalent to the time constant of each first detection electrode 33 in effect. The time constant of each second detection electrode 34 can be adjusted to the time constant of each first detection electrode 33 by changing, for example, the shape (size) of the second detection electrode 34 and its intervals GA1 and GA2 to first detection electrodes 33. Alternatively, the wire resistance value (time constant) of each second detection electrode 34 can be adjusted by changing the length and thickness of the wire (not illustrated) coupled to the second detection electrode 34. In the example illustrated in FIG. 1, the lengths of the second detection electrodes 34-1 and 34-3 in the extension directions thereof are different from each other, and thus the intervals GA1 and GA2 may be differentiated from each other in accordance with the shapes (sizes) thereof. Although one second detection electrode 34 is provided along each of the sides AAs1, AAs2, AAs3, and AAs4 of the detection region AA, a plurality of divided second detection electrodes 34 may be provided along each of the sides AAs1, AAs2, AAs3, and AAs4 as described later.

The wiring substrate 115 is electrically coupled to the substrate 31. The wiring substrate 115 is, for example, a flexible printed circuit (FPC) or a rigid substrate. The detection IC 45 is provided on the wiring substrate 115. The detection IC 45 includes, for example, a control circuit configured to control the touch detection by the detection device 3. The detection IC 45 includes, for example, a drive circuit configured to output a drive signal, and a detection circuit 40 (refer to FIG. 3) configured to perform signal processing of detection signals Vdet1 and Vdet2. The detection IC 45 supplies drive signals to the plurality of first detection electrodes 33 and the plurality of second detection electrodes 34. The plurality of first detection electrodes 33 and the plurality of second detection electrodes 34 output the detection signals Vdet1 and Vdet2 to the detection IC 45 based on change in self-capacitance thereof.

In the present embodiment, the detection device 3 calculates a detection position TA contacting or nearby a first detection electrode 33 that the detection target body Fg overlaps based on the detection signals Vdet1 of the first detection electrode 33 and a plurality of first detection electrodes 33 adjacent to the first detection electrode 33 as hatched in FIG. 1. Accordingly, it is possible to improve the accuracy of the detection position TA in a region overlapping one first detection electrode 33.

In FIG. 1, the detection position TA is calculated based on the detection signals Vdet1 from a total of five first detection electrodes 33 of the first detection electrode 33 that the detection target body Fg overlaps as well as two adjacent first detection electrodes 33 in the first direction Dx and two adjacent first detection electrodes 33 in the second direction Dy. However, the calculation of the detection position TA may use the detection signals Vdet1 from five or more first detection electrodes 33 in addition to the first detection electrode 33 that the detection target body Fg overlaps. When the detection target body Fg is on an outer edge side of the detection region AA, the detection position TA is calculated by additionally using the detection signal Vdet2 from at least one second detection electrode 34. Methods of calculating the position of the detection target body Fg will be described later with reference to FIG. 4 and the following drawings.

Figure 2:
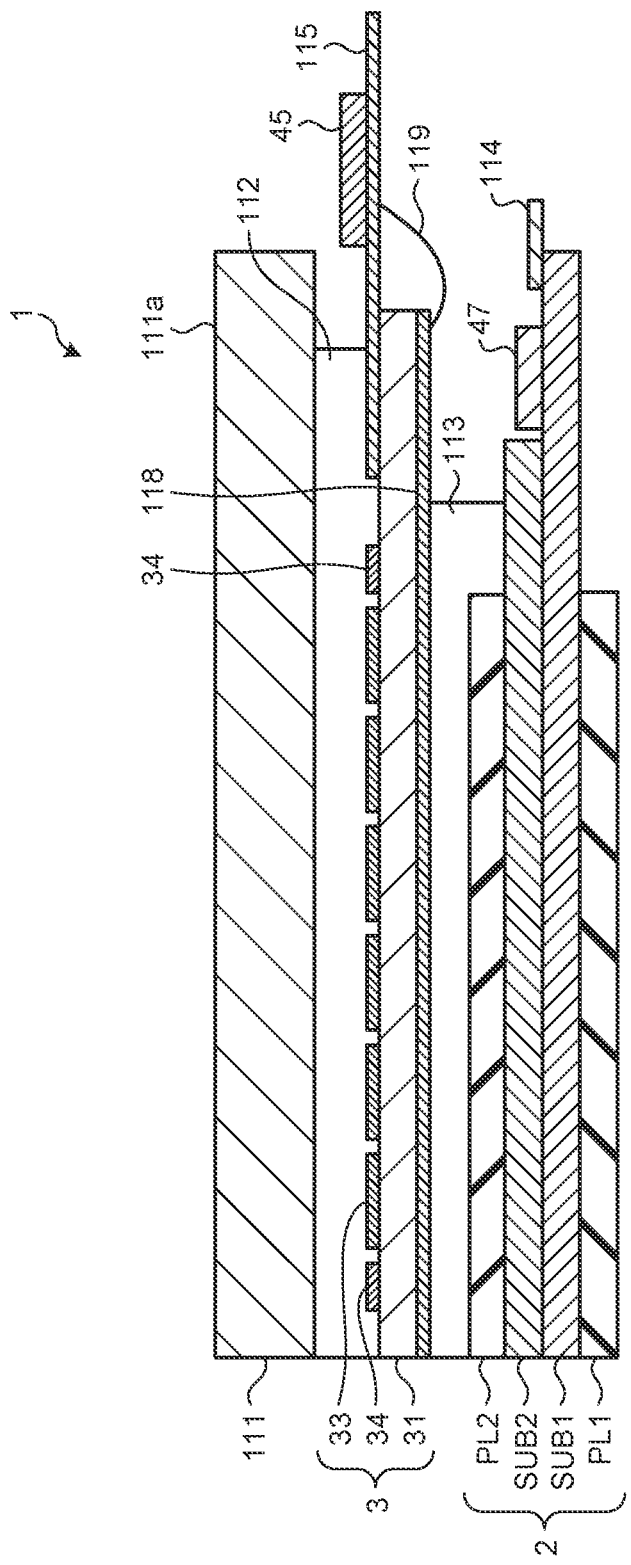
FIG. 2 is a sectional view illustrating a detection-device-equipped display device including the detection device according to the embodiment.

FIG. 2 is a sectional view illustrating a detection-device-equipped display device including the detection device according to the embodiment. As illustrated in FIG. 2, this detection-device-equipped display device 1 includes a display panel 2, the detection device 3, and a cover member 111. The display panel 2, the detection device 3, and the cover member 111 are stacked in the stated order.

The display panel 2 includes an array substrate SUB1, a counter substrate SUB2, a first polarization plate PL1, and a second polarization plate PL2. The first polarization plate PL1, the array substrate SUB1, the counter substrate SUB2, and the second polarization plate PL2 are stacked in the stated order.

The array substrate SUB1 is a drive circuit substrate for driving a plurality of pixels. The counter substrate SUB2 is provided opposite the array substrate SUB1. A liquid crystal layer that is a display functional layer is provided between the array substrate SUB1 and the counter substrate SUB2.

A display integrated circuit (IC) 47 and a wiring substrate 114 are coupled to a protrusion part of the array substrate SUB1. The display IC 47 includes a control circuit configured to control display on the display panel 2. The present disclosure is not limited to this example, and the display IC 47 may be mounted on the wiring substrate 114. The display IC 47 is not limited to this disposition but may be provided on, for example, a control board or a flexible substrate outside a module. The wiring substrate 114 is configured as, for example, a flexible wiring substrate.

The substrate 31 of the detection device 3 is bonded onto the display panel 2 with a bonding layer 113 interposed therebetween. However, an air gap may be provided instead of the bonding layer 113 between the substrate 31 and the display panel 2. The plurality of first detection electrodes 33 and the plurality of second detection electrodes 34 are provided on the same substrate 31. The plurality of first detection electrodes 33 and the plurality of second detection electrodes 34 do not necessarily need to be provided in the same layer but may be provided in different layers. The plurality of first detection electrodes 33 are formed of a translucent conductive material such as indium tin oxide (ITO) or indium zinc oxide (IZO). The plurality of second detection electrodes 34 may be formed of the same material as the plurality of first detection electrodes 33 or may be formed of a material, such as a metallic material, different from that of the plurality of first detection electrodes 33.

A shield layer 118 is provided on a surface of the substrate 31 opposite a surface on which the plurality of first detection electrodes 33 and the plurality of second detection electrodes 34 are provided. In other words, the shield layer 118 is provided between the substrate 31 of the detection device 3 and the display panel 2. The bonding layer 113 contacts the shield layer 118 provided on the substrate 31. The shield layer 118 is electrically coupled to the wiring substrate 115 through a shield wiring substrate 119. The shield wiring substrate 119 is, for example, a flexible printed circuit.

The shield layer 118 contains, for example, translucent conductive oxide such as ITO or IZO, or metal. Examples of the metal include, but are not limited to, metals (zero-valent metal) such as molybdenum, tungsten, tantalum, aluminum, and copper. The shield layer 118 may have a single-layered structure or a multilayered structure. When the shield layer 118 has a multilayered structure, the shield layer 118 may include an oxide-containing layer and a metal-containing layer. The shield layer 118 only needs to be a transmissive conductive layer in any case, and thus can be referred to as a transparent conductive layer.

The shield layer 118 is supplied through the shield wiring substrate 119 with fixed potential (for example, ground potential) or a signal having the same phase as signals provided to the plurality of first detection electrodes 33. In the present embodiment, since the shield layer 118 is provided between the detection device 3 and the display panel 2, the shield layer 118 can shield noise from the display panel 2.

The cover member 111 is bonded onto the detection device 3 with a bonding layer 112 interposed therebetween. The cover member 111 is, for example, a glass substrate or a resin substrate. An upper surface 111a of the cover member 111 is the detection surface in the touch detection (or hover detection), and the detection device 3 detects the detection target body Fg contacting or nearby the upper surface 111a.

The display panel 2 is, for example, a liquid crystal display panel (liquid crystal display (LCD)). However, the display panel 2 is not limited thereto but may be, for example, an organic EL display panel (organic light emitting diode (OLED)) or an inorganic EL display panel (micro LED or mini LED). Alternatively, the display panel 2 may be an electrophoretic display panel (electrophoretic display (EPD)) including an electrophoretic element as a display element. Moreover, the detection-device-equipped display device 1 is not limited to the configuration in which the detection device 3 is provided on the display panel 2, but may have a configuration in which the detection device 3 is integrated with the display panel 2. Specifically, at least one of the substrate 31, the first detection electrodes 33, and the second detection electrodes 34 of the detection device 3 may be shared with a member included in the display panel 2.

Figure 3:
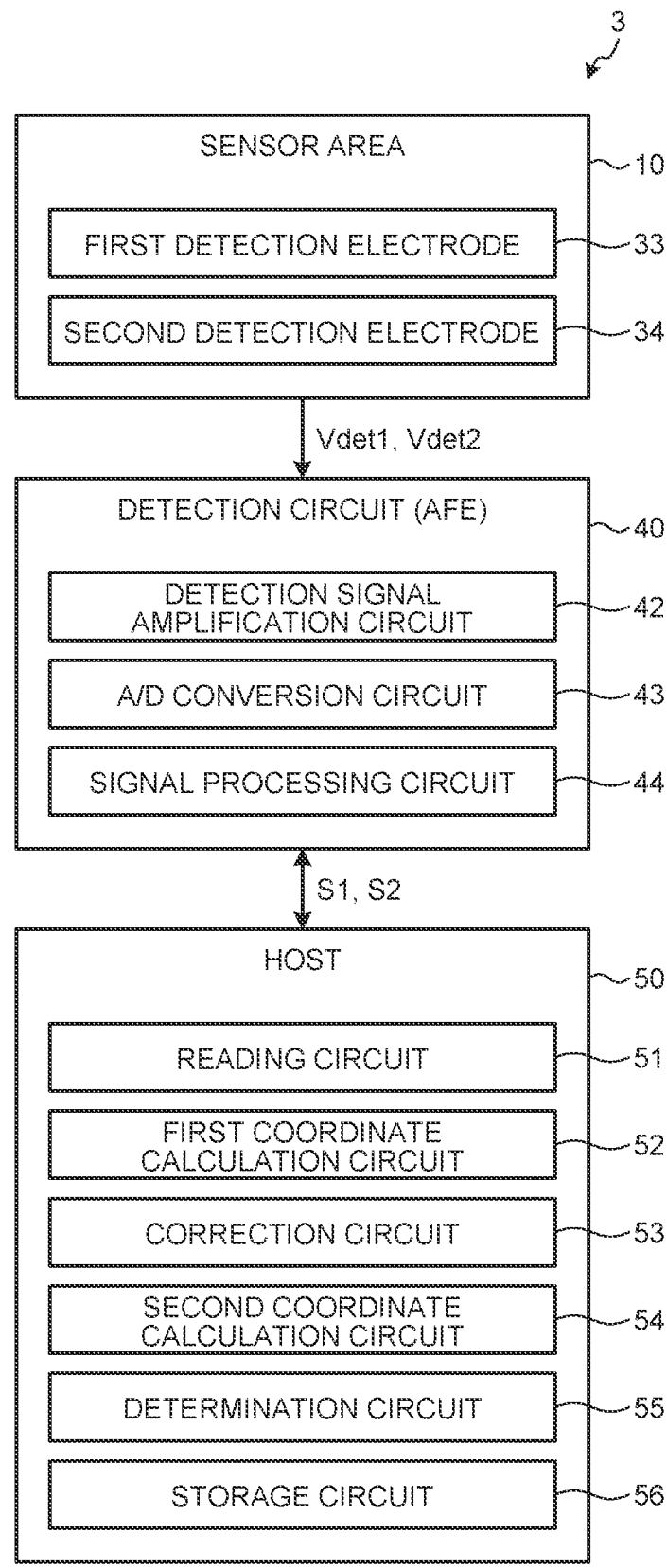
FIG. 3 is a block diagram illustrating an exemplary configuration of the detection device according to the embodiment.

FIG. 3 is a block diagram illustrating an exemplary configuration of the detection device according to the embodiment. As illustrated in FIG. 3, the detection device 3 includes a sensor area 10, the detection circuit 40, and a host 50. The sensor area 10 is constituted by the plurality of first detection electrodes 33 and the plurality of second detection electrodes 34 described above. The sensor area 10 outputs the detection signals Vdet1 and Vdet2 obtained through self-capacitive touch detection to the detection circuit 40.

The detection circuit 40 is, for example, an analog front end circuit (analog front end (AFE)). The detection circuit 40 is a signal processing circuit including a detection signal amplification circuit 42, an A/D conversion circuit 43, and a signal processing circuit 44.

The detection signal amplification circuit 42 amplifies the detection signals Vdet1 and Vdet2. The A/D conversion circuit 43 converts an analog signal output from the detection signal amplification circuit 42 into a digital signal. The signal processing circuit 44 is a circuit configured to perform signal processing on the digital signal output from the A/D conversion circuit 43, and is, for example, a digital filter circuit. The detection circuit 40 performs signal processing on the detection signals Vdet1 and Vdet2 from the sensor area 10 and outputs detection values S1 and S2 to be used in calculation at the host 50. The detection value S1 is a signal based on the detection signal Vdet1 from a first detection electrode 33. The detection value S2 is a signal based on the detection signal Vdet2 from a second detection electrode 34.

The host 50 includes a reading circuit 51, a first coordinate calculation circuit 52, a correction circuit 53, a second coordinate calculation circuit 54, a determination circuit 55, and a storage circuit 56. The reading circuit 51 receives the detection values S1 and S2 from the detection circuit 40 in a predetermined order. The first coordinate calculation circuit 52 calculates the position of the detection target body Fg based on peak positions of the detection values S1 and S2. For example, the first coordinate calculation circuit 52 calculates whether the position of the detection target body Fg is in the detection region AA or the peripheral region BE.

Alternatively, the first coordinate calculation circuit 52 calculates whether the position of the detection target body Fg is on the outer edge side of the detection region AA or at a central part of the detection region AA.

The correction circuit 53 corrects the detection value S2 of a second detection electrode 34. More specifically, when the position of the detection target body Fg is calculated to be on the outer edge side of the detection region AA based on information related to the position of the detection target body Fg from the first coordinate calculation circuit 52, the correction circuit 53 receives a first correction value γs and a second correction value γp, from the storage circuit 56, for a correction-targeted second detection electrode 34 and corrects the detection value S2 of the second detection electrode 34.

The second coordinate calculation circuit 54 calculates the position of the detection target body Fg based on the detection value S1 of a first detection electrode 33 for the detection value S1 at the peak position, the detection values S1 of some first detection electrodes 33 adjacent thereto, and the detection value S2 corrected by the correction circuit 53. The correction of the detection value S2 at the correction circuit 53 and the calculation at the second coordinate calculation circuit 54 will be described later in detail with reference to FIG. 7 and the following drawings.

The determination circuit 55 compares each of the detection values S1 and S2 with a reference value set in advance and determines whether the detection target body Fg is contacting or nearby. In addition, the determination circuit 55 determines the peak positions of the detection values S1 and S2 by comparing a plurality of detection values S1 and a plurality of detection values S2 in a case of the touch detection (or hover detection) of the detection target body Fg.

The storage circuit 56 stores, as a correction table, information related to the reference value for determination of the touch detection (or hover detection) and the correction values of the detection value S2.

In FIG. 3, to facilitate understanding, a separate circuit is illustrated for each processing performed by the host 50, but this configuration is merely exemplary and may be changed as appropriate. For example, the first coordinate calculation circuit 52, the correction circuit 53, the second coordinate calculation circuit 54, and the determination circuit 55 may be achieved as one circuit.

Figure 4:
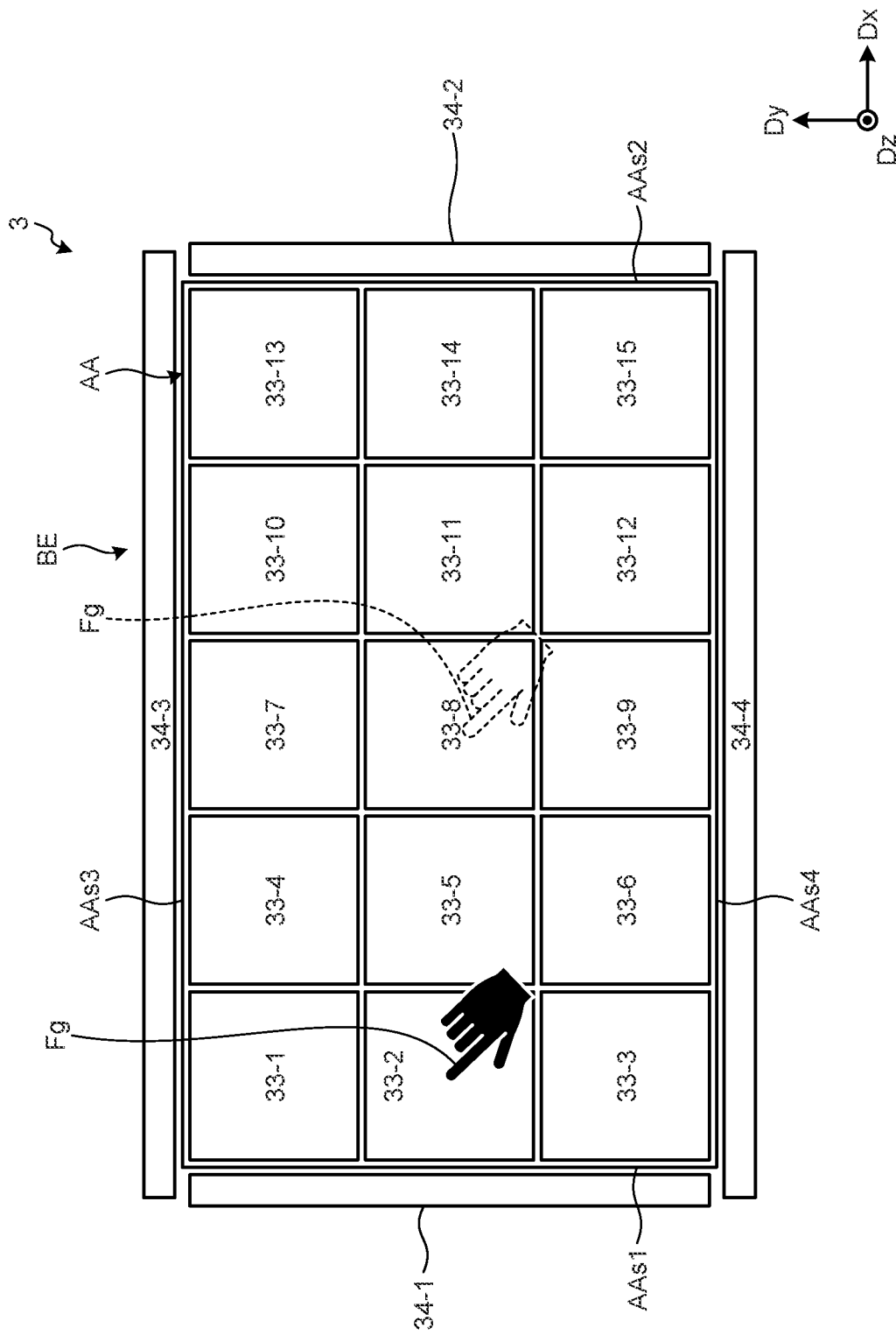
FIG. 4 is an explanatory diagram for description of a method of calculating a first correction value of a second detection electrode when a detection target body is at a central part of a first detection electrode on an outer edge side of a detection region.

The following describes a method of calculating the correction values of the detection value S2 of a second detection electrode 34 in the detection device 3 of the present embodiment. FIG. 4 is an explanatory diagram for description of a method of calculating the first correction value of a second detection electrode when detection target body is at a central part of a first detection electrode on the outer edge side of the detection region. For simplification of description, FIG. 4 illustrates an example in which the first detection electrodes 33 are disposed in three rows and five columns. The plurality of first detection electrodes 33 are illustrated sequentially in columns from the upper-left corner in FIG. 4 in the order of first detection electrodes 33-1, 33-2, 33-3, . . . , 33-15. However, the first detection electrodes 33-1, 33-2, 33-3, . . . , 33-15 are collectively referred to as first detection electrodes 33 when not needed to be distinguished from each other.

The following description will be mainly made on correction of a detection value S2-1 of the second detection electrode 34-1 when the detection target body Fg is positioned in a region along the side AAs1 on the outer edge side of the detection region AA. However, a concept of correction of the detection value S2-1 of the second detection electrode 34-1 is applicable to correction of detection values S2-2, S2-3, and S2-4 of the other second detection electrodes 34-2, 34-3, and 34-4. FIG. 4 indicates both a case in which the detection target body Fg (illustrated in black) is on the outer edge side of the detection region AA (at a central part of the first detection electrode 33-2) and a case in which the detection target body Fg (illustrated with dotted lines) is at the central part of the detection region AA (a position overlapping the first detection electrode 33-8).

In the present embodiment, "the central part of the detection region AA" is a region not overlapping some first detection electrodes 33 adjacent to the sides AAs1, AAs2, AAs3, and AAs4 of the detection region AA and is a region on the inner side of the first detection electrodes 33. In the example illustrated in FIG. 4, a region overlapping the first detection electrodes 33-5, 33-8, and 33-11 is "the central part of the detection region AA". A region overlapping the first detection electrodes 33-1, 33-2, 33-3, 33-4, 33-6, 33-7, 33-9, 33-10, 33-12, 33-13, 33-14, and 33-15 is "the outer edge side of the detection region AA".

In other words, when the detection target body Fg is at the central part of the detection region AA (at the first detection electrode 33-8), another first detection electrode 33-9 (or first detection electrode 33-7) is disposed between the first detection electrode 33-8 indicating the maximum detection value S1 and the side AAs4 (or side AAs3) closest to the first detection electrode 33-8 indicating the maximum detection value S1, among the sides of the detection region AA. Alternatively, when the detection target body Fg is on the outer edge side of the detection region AA (at the first detection electrode 33-2), no other first detection electrode 33 is disposed between the first detection electrode 33-2 indicating the maximum detection value S1 and the side AAs1 closest to the first detection electrode 33-2 indicating the maximum detection value S1, among the sides of the detection region AA.

When the detection target body Fg (illustrated with dotted lines) is at the central part of the detection region AA (for example, at the position overlapping the first detection electrode 33-8), the second coordinate calculation circuit 54 calculates the detection position of the detection target body Fg based on the detection value S1 of the first detection electrode 33-8 indicating the maximum detection value S1 and the detection values S1 of the first detection electrodes 33-5, 33-7, 33-9, and 33-11 adjacent to the first detection electrode 33-8 indicating the maximum detection value S1. Accordingly, the second coordinate calculation circuit 54 calculates distribution (change amount) of the detection value S1 across a plurality of first detection electrodes 33.

Distribution of the detection value S1 across the plurality of first detection electrodes 33 differs in accordance with the position of the detection target body Fg in the first detection electrode 33-8. For example, when the detection target body Fg is positioned at the center of the first detection electrode 33-8, the deviation of the detection values S1 of the plurality of adjacent first detection electrodes 33-5, 33-7, 33-9, and 33-11 is small. When the detection target body Fg is positioned on a peripheral side of the first detection electrode 33-8, the deviation of the detection values S1 of the plurality of adjacent first detection electrodes 33-5, 33-7, 33-9, and 33-11 is large. Through calculation of distribution of the detection value S1, the second coordinate calculation circuit 54 can calculate a detailed detection position of the detection target body Fg in the first detection electrode 33-8 indicating the maximum detection value S1.

When the detection target body Fg (illustrated in black) is on the outer edge side of the detection region AA (for example, at the central part of the first detection electrode 33-2), the second coordinate calculation circuit 54 calculates the detection position based on the detection value S1 of the first detection electrode 33-2 indicating the maximum detection value S1, the detection value S2 of the at least one second detection electrode 34-1 adjacent to the first detection electrode 33-2 indicating the maximum detection value S1, and the detection values S1 of the three first detection electrodes 33-1, 33-3, and 33-5 adjacent to the first detection electrode 33-2 indicating the maximum detection value S1.

Figure 5:
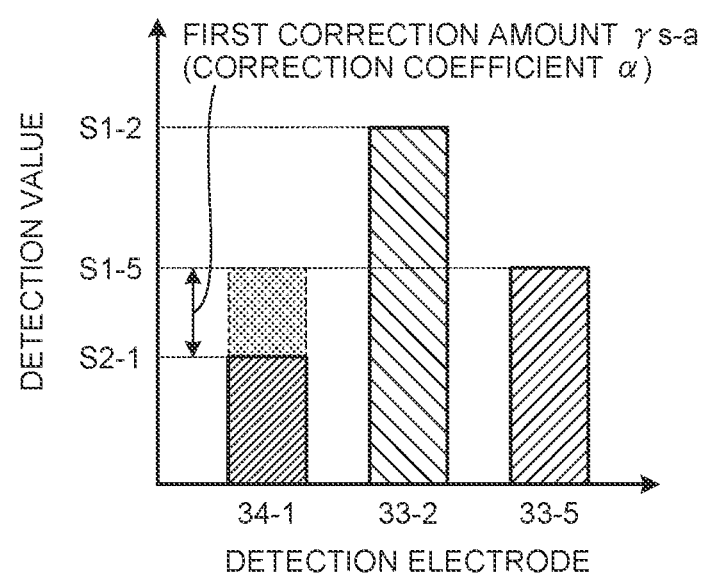
FIG. 5 is an explanatory diagram for schematic description of the relation among detection values, first detection electrodes, and a second detection electrode in the case of FIG. 4.

FIG. 5 is an explanatory diagram for schematic description of the relation among detection values, first detection electrodes, and a second detection electrode in the case of FIG. 4. When the detection target body Fg (illustrated in black) is on the outer edge side of the detection region AA (at the central part of the first detection electrode 33-2), the detection value S2 of the second detection electrode 34-1 adjacent to the first detection electrode 33-2 and the detection value S1 of the first detection electrode 33-5 adjacent to the first detection electrode 33-2 are preferably equivalent to each other in an ideal case. However, since the shape (size) of each second detection electrode 34 is different from that of each first detection electrode 33, capacitance formed between the detection target body Fg and the second detection electrode 34 is different from capacitance formed between the detection target body Fg and the first detection electrode 33. As a result, as illustrated in FIG. 5, the detection value S2 (S2-1) of the second detection electrode 34-1 is smaller than the detection value S1 (S1-5) of the first detection electrode 33-5.

The storage circuit 56 stores a first correction amount γs-a as the first correction value γs in accordance with the sensitivity of a second detection electrode 34 when detection target body Fg is on the outer edge side of the detection region AA (for example, at the central part of the first detection electrode 33-2). The first correction amount γs-a can be obtained using a correction coefficient α set so that the detection value S2 (S2-1) of the second detection electrode 34-1 is equivalent to the detection value S1 (S1-5) of the first detection electrode 33-5. In other words, a value obtained by adding the first correction amount γs-a to the detection value S2 (S2-1) of the second detection electrode 34-1 is equivalent to the detection value S1 (S1-5) of the first detection electrode 33-5.

Figure 6:
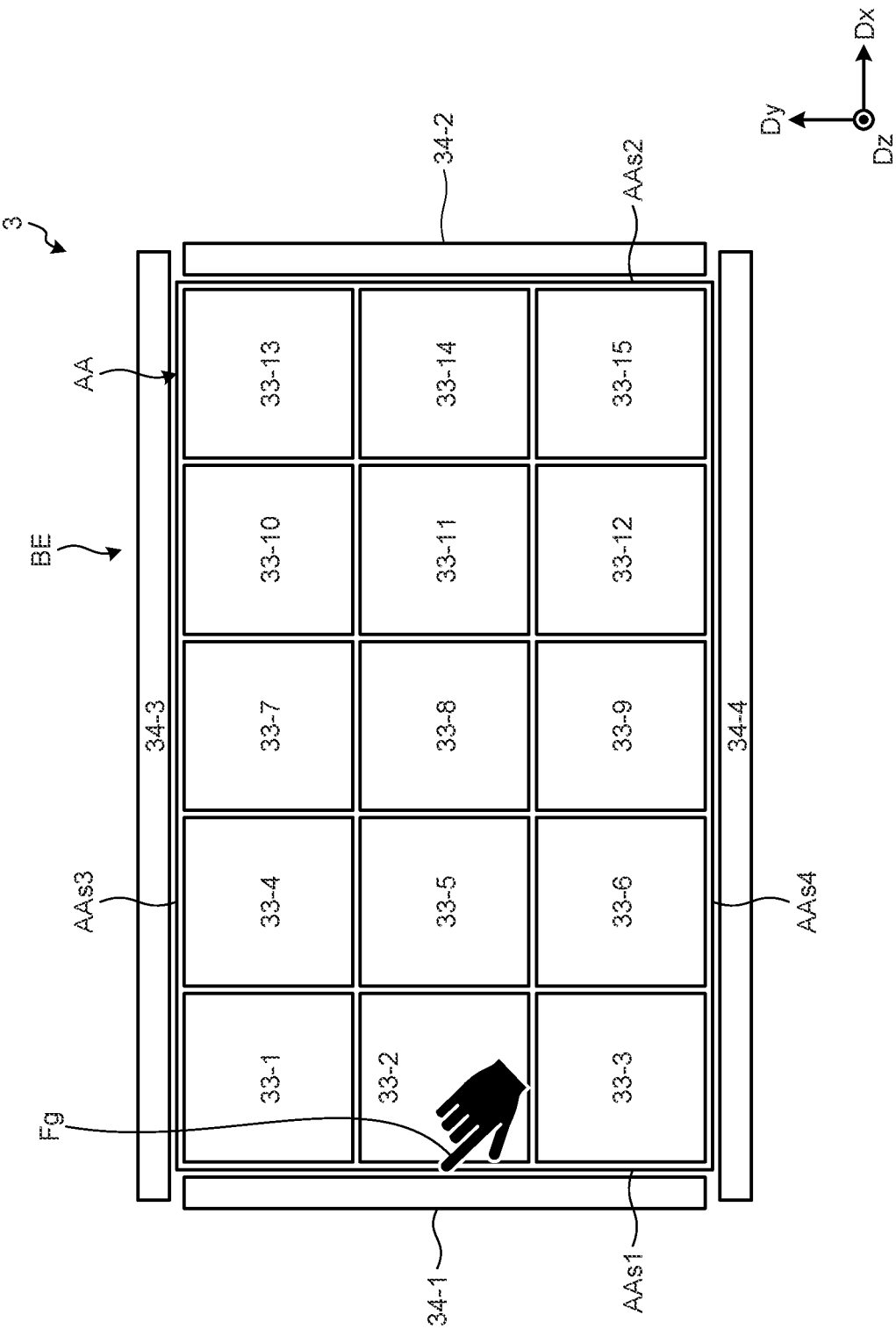
FIG. 6 is an explanatory diagram for description of a method of calculating the first correction value of a second detection electrode when the detection target body is between a first detection electrode and the second detection electrode on the outer edge side of the detection region.

FIG. 6 is an explanatory diagram for description of a method of calculating the first correction value of a second detection electrode when the detection target body is between a first detection electrode and a second detection electrode on the outer edge side of the detection region.

As illustrated in FIG. 6, the detection target body Fg is shifted to the second detection electrode 34-1 side from the state illustrated in FIG. 4 and positioned in a region between the second detection electrode 34-1 and the first detection electrode 33-2. When the detection target body Fg is in the region between the second detection electrode 34-1 and the first detection electrode 33-2 (region overlapping the side AAs1 of the detection region AA), the second coordinate calculation circuit 54 calculates the detection position based on the detection value S1 of the first detection electrode 33-2 indicating the maximum detection value S1, the detection value S2 of the at least one second detection electrode 34-1 adjacent to the first detection electrode 33-2 indicating the maximum detection value S1, the detection values S1 of the three first detection electrodes 33-1, 33-3, and 33-5.

Figure 7:
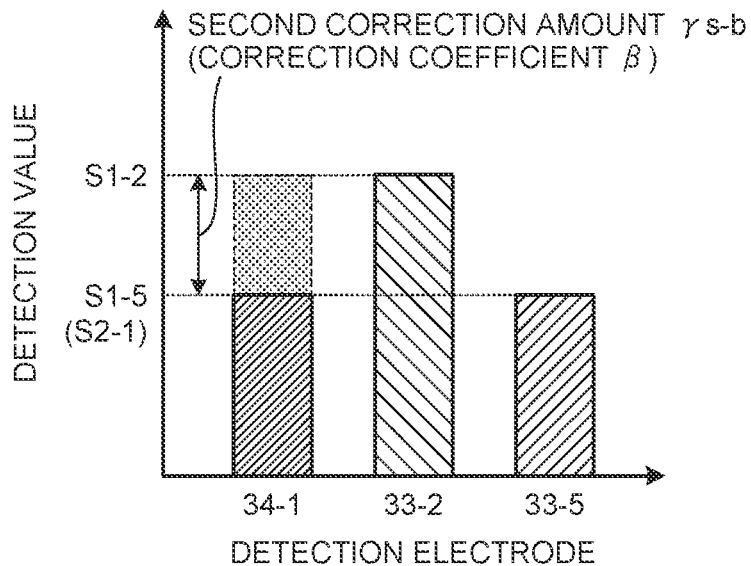
FIG. 7 is an explanatory diagram for schematic description of the relation among detection values, first detection electrodes, and a second detection electrode in the case of FIG. 6.

FIG. 7 is an explanatory diagram for schematic description of the relation among detection values, first detection electrodes, and a second detection electrode in the case of FIG. 6. Since the detection target body Fg is shifted to the second detection electrode 34-1 side from the state illustrated in FIG. 4, the detection value S2-1 of the second detection electrode 34-1 is larger than in FIG. 4 and the detection value S1-5 of the first detection electrode 33-5 is smaller than in FIG. 4, as illustrated in FIG. 7.

When the detection target body Fg is positioned in the region between the second detection electrode 34-1 and the first detection electrode 33-2, the detection value S1 (S1-2) of the first detection electrode 33-2 and the detection value S2 (S2-1) of the second detection electrode 34-1 adjacent to the first detection electrode 33-2 are preferably equivalent to each other in an ideal case. However, as illustrated in FIG. 7, the detection value S2 (S2-1) of the second detection electrode 34-1 is smaller than the detection value S1 (S1-2) of the first detection electrode 33-2 due to the shape (size) of the second detection electrode 34 as described above.

The storage circuit 56 stores a second correction amount γs-b as the first correction value γs in accordance with the sensitivity of a second detection electrode 34 when the detection target body Fg is on the outer edge side of the detection region AA (for example, in the region between the second detection electrode 34-1 and the first detection electrode 33-2). The second correction amount γs-b can be obtained using a correction coefficient β set so that the detection value S2 (S2-1) of the second detection electrode 34-1 is equivalent to the detection value S1 (S1-2) of the first detection electrode 33-2. In other words, a value obtained by adding the second correction amount γs-b to the detection value S2 (S2-1) of the second detection electrode 34-1 is equivalent to the detection value S1 (S1-2) of the first detection electrode 33-2.

The detection value S2 (S2-1) of the second detection electrode 34-1 is equivalent to the detection value S1 (S1-5) of the first detection electrode 33-5 in FIG. 7. However, FIG. 7 is merely exemplary, and the detection value S2 (S2-1) may be different from the detection value S1 (S1-5).

The storage circuit 56 stores the first correction value γs in accordance with the sensitivity of the second detection electrodes 34. The first correction value γs is obtained in accordance with the sensitivity of the second detection electrodes 34 based on the first correction amount γs-a (correction coefficient α) described above with reference to FIGS. 4 and 5 and the second correction amount γs-b (correction coefficient β) described above with reference to FIGS. 6 and 7. More specifically, the first correction value γs of the detection value S2 of the second detection electrode 34-1 is determined based on the average value of the first correction amount γs-a (corresponding to the correction coefficient α) of the detection value S2 of the second detection electrode 34 when the detection target body Fg is positioned at the central part of a first detection electrode 33 adjacent to the second detection electrode 34 and the second correction amount γs-b (corresponding to the correction coefficient β) of the detection value S2 of the second detection electrode 34 when the detection target body Fg is positioned in the region between the second detection electrodes 34 and the first detection electrode 33.

Weighting may be applied instead of the average value when the correction coefficient α and the correction coefficient β are largely different from each other depending on the shapes of the electrodes. For example, the first correction value γs when the average value is applied is obtained by $γs = Xα + Yβ (X = Y = 0.5)$, and the first correction value γs when weighting is applied can be obtained by $γs = Xα + Yβ$ ($X = 0.6$ and $Y = 0.4$). However, the values such as $X = 0.6$ and $Y = 0.4$ are merely exemplary and may be appropriately set in accordance with the shapes of the electrodes or the like.

When the detection target body Fg is positioned on the outer edge side of the detection region AA, the correction circuit 53 can correct variance of the detection value S2 of a second detection electrode 34 due to the shape (size) thereof based on the first correction value γs.

Figure 8:
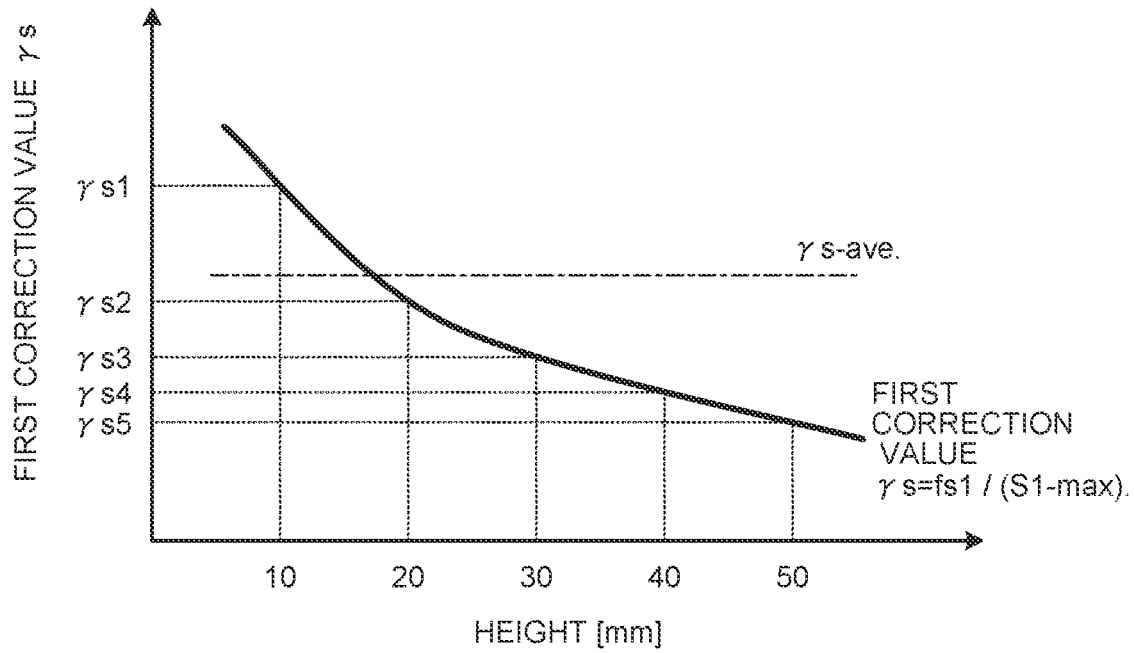
FIG. 8 is a graph schematically illustrating the relation between the first correction value of a second detection electrode and the height of the detection target body.

FIG. 8 is a graph schematically illustrating the relation between the first correction value of a second detection electrode and the height of the detection target body. In the graph illustrated in FIG. 8, the vertical axis represents the first correction value γs, and the horizontal axis represents the height of the detection target body Fg from the detection surface (for example, the upper surface 111a of the cover member 111 illustrated in FIG. 2). As described above, the detection device 3 of the present embodiment can perform the hover detection, and the first correction value γs is different for each height of the detection target body Fg.

As illustrated in FIG. 8, the first correction value γs tends to decrease as the height of the detection target body Fg increases. The storage circuit 56 stores, as a correction table of the second detection electrode 34, the relation between the height of the detection target body Fg and the first correction value γs. The storage circuit 56 stores, as the correction table, for example, a function obtained from the relation between each height 10 mm, 20 mm, 30 mm, 40 mm, or 50 mm of the detection target body Fg and the corresponding one of first correction values γs1, γs2, γs3, γs4, γs5. Expression (1) below is an exemplary function of the first correction value γs. In Expression (1), "fs1" is a constant or a function. In addition, "S1-max" represents the maximum detection value S1 of a first detection electrode 33, and the maximum value S1-max differs in accordance with the height of the detection target body Fg. In this manner, the maximum value S1-max includes information related to the height of the detection target body Fg and Expression (1) includes the maximum value S1-max, and accordingly, the first correction value γs is obtained in accordance with the height of the detection target body Fg.

$$\gamma s = fs1/(S1\text{-max}) \quad (1)$$

The correction circuit 53 corrects the detection value S2 of the second detection electrode 34 by multiplying the detection value S2 of the second detection electrode 34 by the first correction value γs obtained through the function of Expression (1). Accordingly, the correction circuit 53 can correct variance of the detection value S2 due to the shape (size) of the second detection electrode 34 and the height of the detection target body Fg when the detection target body Fg is positioned on the outer edge side of the detection region AA.

The storage circuit 56 may store an average value γs-ave of the first correction value γs instead of the function of Expression (1). The average value γs-ave is, for example, the average value of the first correction values γs1, γs2, γs3, γs4, and γs5 described above. The correction circuit 53 can correct the detection value S2 of the second detection electrode 34 by using the average value γs-ave of the first correction value γs. In this case, the detection device 3 can reduce the amount of calculation by the correction circuit 53.

Figure 9:
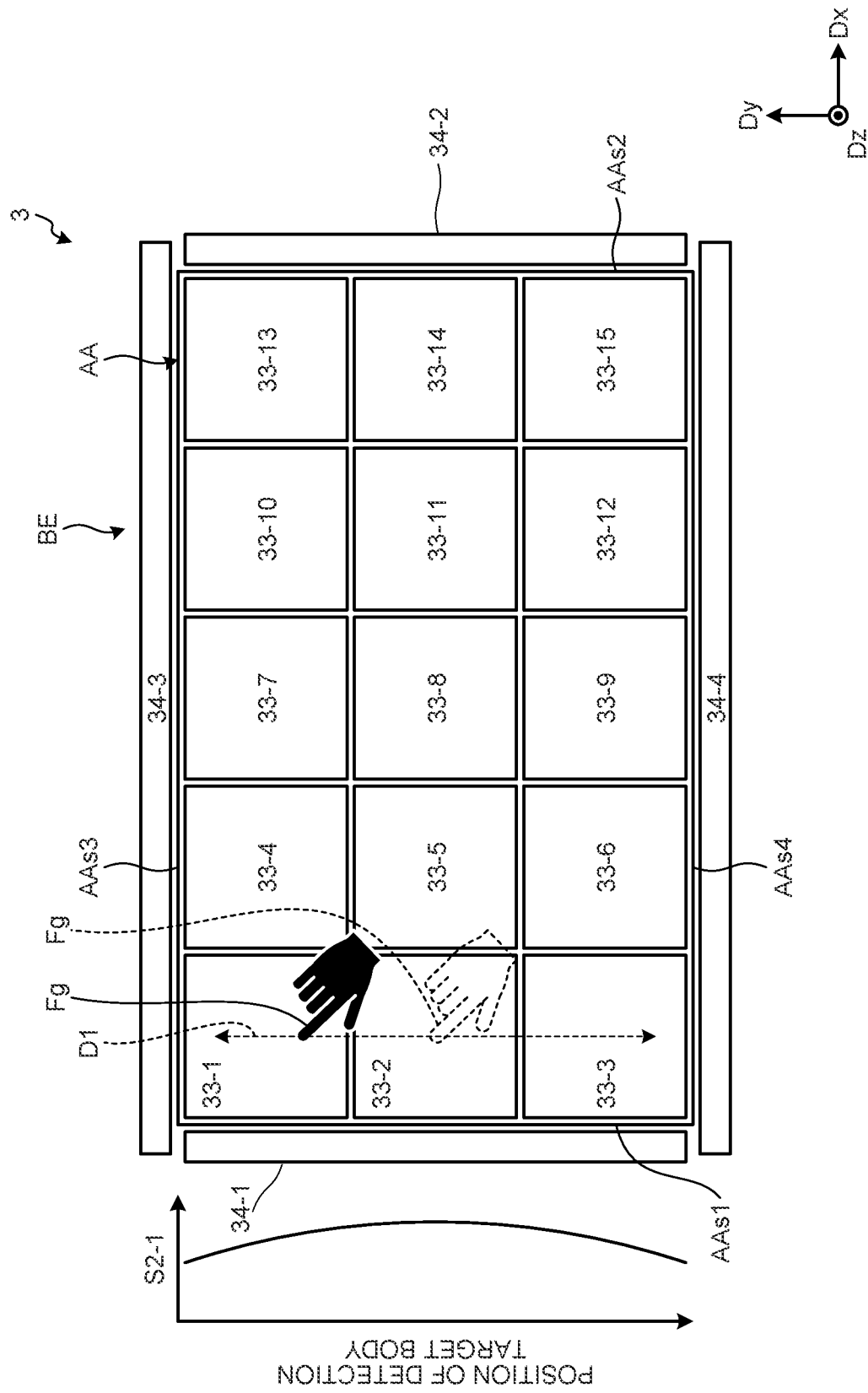
FIG. 9 is an explanatory diagram for description of a method of calculating a second correction value of a second detection electrode.

The following describes correction of the detection value S2 of a second detection electrode 34 due to the position of the detection target body Fg in the extension direction of the second detection electrode 34. FIG. 9 is an explanatory diagram for description of method of calculating the second correction value of a second detection electrode. FIG. 9 also illustrates a graph schematically illustrating the relation between the position of the detection target body Fg in the second direction Dy and the detection value S2-1 of the second detection electrode 34-1.

As illustrated in FIG. 9, the second detection electrode 34-1 extends in the second direction Dy along the side AAs1 of the detection region AA. When the distance between the second detection electrode 34-1 and the detection target body Fg in the first direction Dx is constant and the height of the detection target body Fg from the detection surface is constant, the detection value S2-1 of the second detection electrode 34-1 is different in accordance with the position of the detection target body Fg in the extension direction (direction illustrated with arrow D1) of the second detection electrode 34-1.

The detection value S2-1 is relatively large when the detection target body Fg is positioned at the central part of the second detection electrode 34-1 in the extension direction, and the detection value S2-1 is relatively small when the detection target body Fg is positioned at an end part of the second detection electrode 34-1 in the extension direction.

Figure 10:
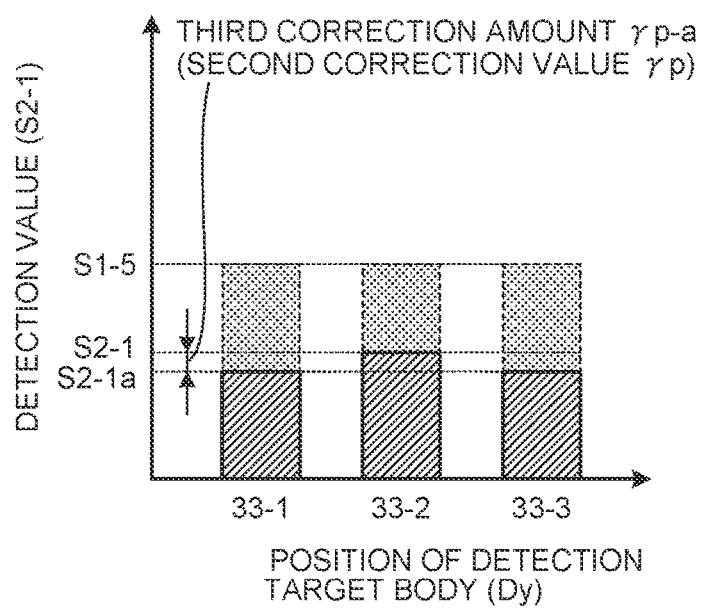
FIG. 10 is a graph schematically illustrating the relation between the detection value of a second detection electrode and the position of the detection target body in the case of FIG. 9.

FIG. 10 is a graph schematically illustrating the relation between the detection value of the second detection electrode and the position of the detection target body in the case of FIG. 9. In the graph illustrated in FIG. 10, the horizontal axis represents the position of the detection target body Fg in the second direction Dy and indicates cases in which the detection target body Fg is positioned at the central parts of the respective first detection electrodes 33-1, 33-2, and 33-3. In the graph illustrated in FIG. 10, the vertical axis represents the detection value S2-1 of the second detection electrode 34-1. For comparison, FIG. 10 also illustrates the detection value S1-5 of the first detection electrode 33-5 adjacent to the first detection electrode 33-1 on the opposite side of the second detection electrode 34-1.

As illustrated in FIG. 10, the storage circuit 56 stores a third correction amount γp-a as the second correction value γp of the detection value S2 of the second detection electrode 34 in accordance with the position of the detection target body Fg in the second direction Dy. The third correction amount γp-a is a value set so that the detection value S2 (S2-1) of the second detection electrode 34-1 is maintained constant among cases in which the position of the detection target body Fg in the extension direction of the second detection electrode 34-1 is different. In other words, a value obtained by adding the third correction amount γp-a to the detection value S2 (S2-1a) of the second detection electrode 34-1 when the detection target body Fg is positioned at an end part of the second detection electrode 34-1 in the extension direction (at the first detection electrode 33-1 or 33-3) is equivalent to the detection value S2 (S2-1) of the second detection electrode 34-1 when the detection target body Fg is positioned at the central part of the second detection electrode 34-1 in the extension direction (at the first detection electrode 33-2).

In this manner, the storage circuit 56 stores, as a correction value of the detection value S2 of the second detection electrode 34, the second correction value γp in accordance with the position of the detection target body Fg in the extension direction of the second detection electrode 34-1 in addition to the first correction value γs described above with reference to FIGS. 4 to 8. The correction circuit 53 can correct, by using the second correction value γp, variance of the detection value S2 due to the position of the detection target body Fg in the extension direction of the second detection electrode 34 when the detection target body Fg is positioned on the outer edge side of the detection region AA.

Figure 11:
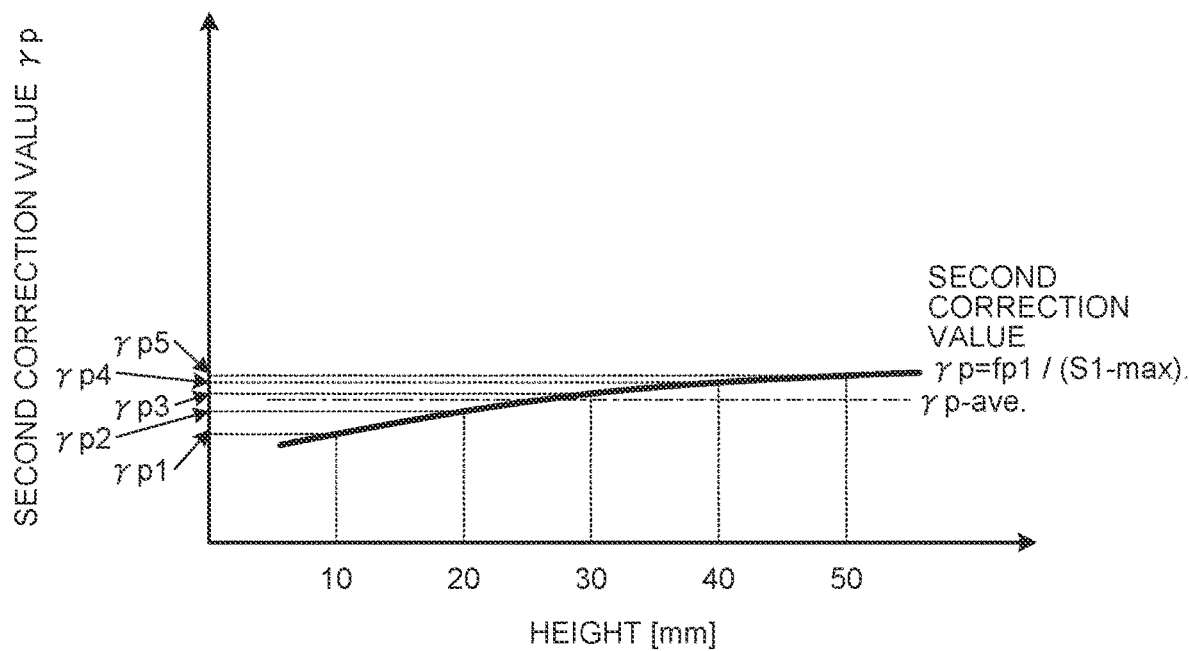
FIG. 11 is a graph schematically illustrating the relation between the second correction value of a second detection electrode and the height of the detection target body.

FIG. 11 is a graph schematically illustrating the relation between the second correction value of the second detection electrode and the height of the detection target body. In the graph illustrated in FIG. 11, the vertical axis represents the second correction value γp, and the horizontal axis represents the height of the detection target body Fg from the detection surface (for example, the upper surface 111a of the cover member 111 illustrated in FIG. 2). Similarly to the example illustrated in FIG. 8, the second correction value γp is different for each height of the detection target body Fg.

As illustrated in FIG. 11, the second correction value γp tends to increase as the height of the detection target body Fg increases. The storage circuit 56 stores, as a correction table of the second detection electrode 34, the relation between the height of the detection target body Fg and the second correction value γp. The storage circuit 56 stores, as the correction table, for example, a function obtained from the relation between each height 10 mm, 20 mm, 30 mm, 40 mm, or 50 mm of the detection target body Fg and the corresponding one of second correction values γp1, γp2, γp3, γp4, and γp5. Expression (2) below is an exemplary function of the second correction value γp. In Expression (2), "fp1" is a constant or a function. Similarly to Expression (1) described above, Expression (2) includes the maximum value S1-max, and accordingly the second correction value γp is obtained in accordance with the height of the detection target body Fg.

$$\gamma p = fp1/(S1\text{-max}) \quad (2)$$

The correction circuit 53 corrects the detection value S2 of the second detection electrode 34 by multiplying the detection value S2 of the second detection electrode 34 by the second correction value γp obtained through the function of Expression (2). Accordingly, the correction circuit 53 can correct variance of the detection value S2 due to the position of the detection target body Fg in the extension direction of the second detection electrode 34 and the height of the detection target body Fg when the detection target body Fg is positioned on the outer edge side of the detection region AA.

The storage circuit 56 may store an average value γp-ave of the second correction value γp instead of the function of Expression (2). The average value γp-ave is, for example, the average value of the second correction values γp1, γp2, γp3, γp4, and γp5 described above. The correction circuit 53 can correct the detection value S2 of the second detection electrode 34 by using the average value γp-ave of the second correction value γp. In this case, the amount of calculation by the correction circuit 53 can be reduced.

FIG. 12 is a table illustrating an exemplary correction table of the detection value of a second detection electrode. FIG. 13 is a table illustrating another exemplary correction table of the detection value of a second detection electrode. The storage circuit 56 stores, as the correction tables illustrated in FIGS. 12 and 13, the first correction value γs and the second correction value γp of the detection value S2 of the second detection electrode 34 described above.

The correction table illustrated in FIG. 12 lists the first correction value γs and the second correction value γp when the detection target body Fg is at a part along the side AAs1 or AAs2 on the outer edge side of the detection region AA. The correction table illustrated in FIG. 13 lists the first correction value γs and the second correction value γp when the detection target body Fg is at a part along the side AAs3 or AAs4 on the outer edge side of the detection region AA.

As illustrated in FIGS. 12 and 13, each correction table includes the first correction value γs and the second correction value γp that are set for each combination of the detection target body Fg (in other words, a first detection electrode 33 indicating the peak of the detection value S1) and a correction-targeted second detection electrode 34. The first correction value γs and the second correction value γp are the same functions as Expressions (1) and (2) described above, respectively. In the first correction value γs and the second correction value γp, "fs1" to "fs4" and "fp1" to "fp4" are each a constant or a function. In addition, "S1-1 (max)" to "S1-15 (max)" are each the maximum detection value S1 of a first detection electrode 33 and include information related to the height of the detection target body Fg.

The correction circuit 53 acquires the first correction value γs and the second correction value γp from the correction tables illustrated in FIGS. 12 and 13 in accordance with the position of the detection target body Fg and the correction-targeted second detection electrode 34, and corrects the detection value S2 of the second detection electrode 34. Accordingly, the correction circuit 53 can correct variance of the detection value S2 due to the shape (size) of the second detection electrode 34, variance of the detection value S2 due to the position of the detection target body Fg in the extension direction of the second detection electrode 34, and variance of the detection value S2 due to the height of the detection target body Fg when the detection target body Fg is positioned on the outer edge side of the detection region AA.

When the detection target body Fg is on the outer edge side of the detection region AA, the second coordinate calculation circuit 54 calculates the position of the detection target body Fg based on a value (hereinafter referred to as a corrected detection value S2) obtained by multiplying the detection value S2 of at least one second detection electrode 34 by the first correction value γs and the second correction value γp. Specifically, the second coordinate calculation circuit 54 calculates the detection position based on the first detection electrode 33 indicating the maximum detection value S1, the corrected detection value S2 of at least one second detection electrode 34 adjacent to the first detection electrode 33 indicating the maximum detection value S1, and the detection values S1 of at least two first detection electrodes 33 adjacent to the first detection electrode 33 indicating the maximum detection value S1. Accordingly, a detailed position of the detection target body Fg in the first detection electrode 33 indicating the maximum detection value S1 can be calculated.

For example, when the detection target body Fg is at the central part of the first detection electrode 33-2 on the outer edge side of the detection region AA, the second coordinate calculation circuit 54 calculates the detection position of the detection target body Fg based on the detection value S1 of the first detection electrode 33-2 indicating the maximum detection value S1, the corrected detection value S2 of the second detection electrode 34-1 adjacent to the first detection electrode 33-2, and the detection values S1 of the three first detection electrodes 33-1, 33-3, and 33-5 adjacent to the first detection electrode 33-2. When the detection target body Fg is at the central part of the first detection electrode 33-1 at a corner of the detection region AA, the second coordinate calculation circuit 54 calculates the detection position of the detection target body Fg based on the detection value S1 of the first detection electrode 33-1 indicating the maximum detection value S1, the corrected detection values S2 of the two second detection electrodes 34-1 and 34-3 adjacent to the first detection electrode 33-1, and the detection values S1 of the two first detection electrodes 33-2 and 33-4.

The following describes a detection method by the detection device 3 of the present embodiment. FIG. 14 is a flowchart for description of the detection method by the detection device according to the embodiment. As illustrated in FIG. 14, the detection device 3 detects baselines by driving the first detection electrodes 33 and the second detection electrodes 34 while the detection target body Fg is not on the detection surface (step ST1). The storage circuit 56 (refer to FIG. 3) stores the baselines detected based on the detection values S1 and S2 of the first detection electrodes 33 and the second detection electrodes 34.

Subsequently, the detection device 3 executes the touch detection by driving the first detection electrodes 33 and the second detection electrodes 34 (step ST2). The detection circuit 40 (refer to FIG. 3) performs the above-described various kinds of signal processing on the detection signals Vdet1 and Vdet2 from the first detection electrodes 33 and the second detection electrodes 34 and transmits the detection values S1 and S2 to the host 50. The first coordinate calculation circuit 52 of the host 50 calculates the difference between each of the detection values S1 and S2 from the detection circuit 40 and the corresponding baseline.

The determination circuit 55 compares the detection value S1 of a first detection electrode 33 with a threshold set in advance and determines whether the detection value S1 is equal to or larger than the threshold (step ST3). When the detection value S1 is smaller than the threshold (No at step ST3), the determination circuit 55 determines that no detection target body Fg is in contact or nearby the detection surface, and executes the touch detection at step ST2.

When the detection value S1 is equal to or larger than the threshold (Yes at step ST3), the determination circuit 55 determines that the detection target body Fg is in contact or nearby the detection surface. Then, the determination circuit 55 determines whether the detection target body Fg is positioned in the detection region AA (step ST4).

Figure 15:
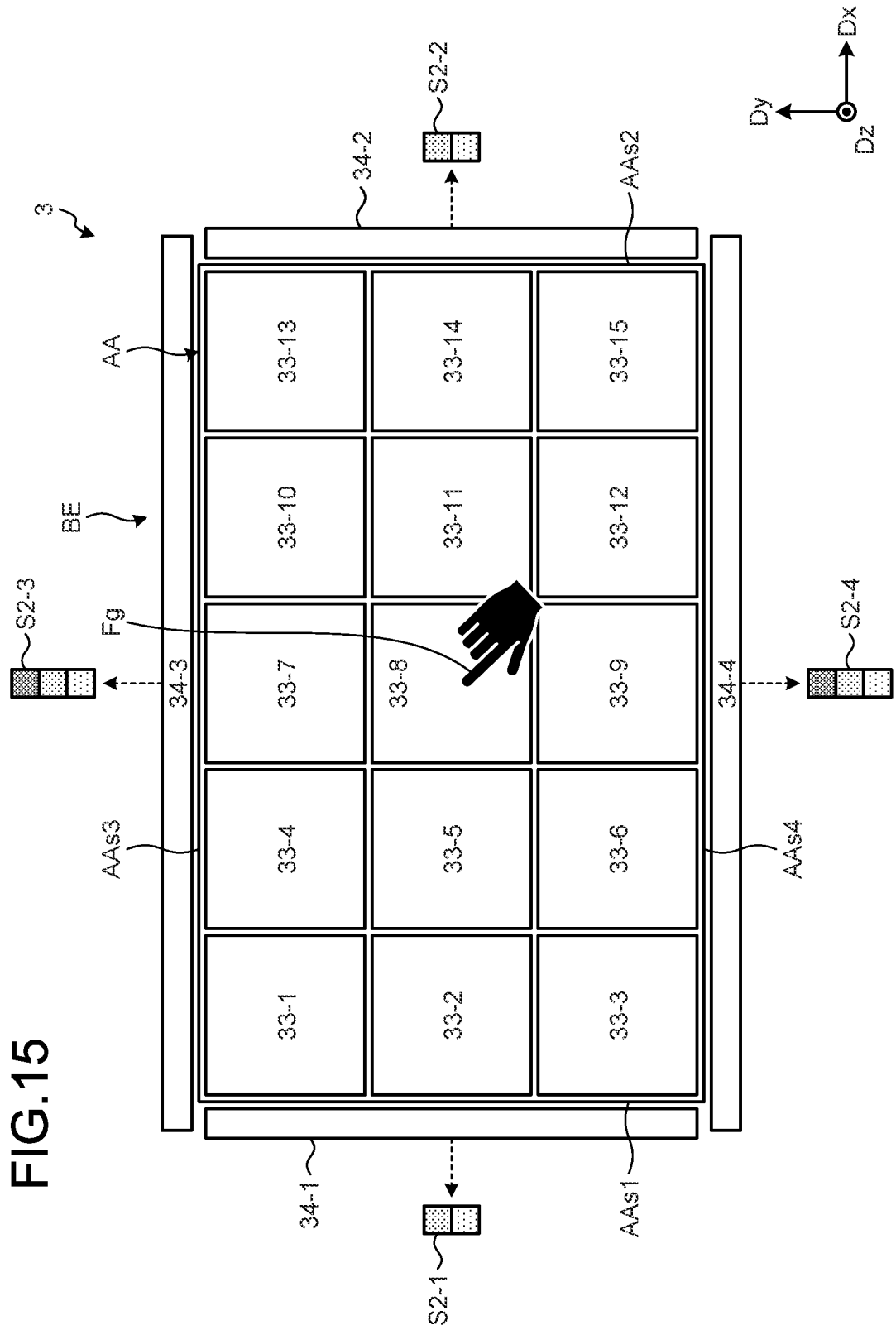
FIG. 15 is an explanatory diagram for description of a method of detecting the detection target body with a second detection electrode when the detection target body is in the detection region.
Figure 16:
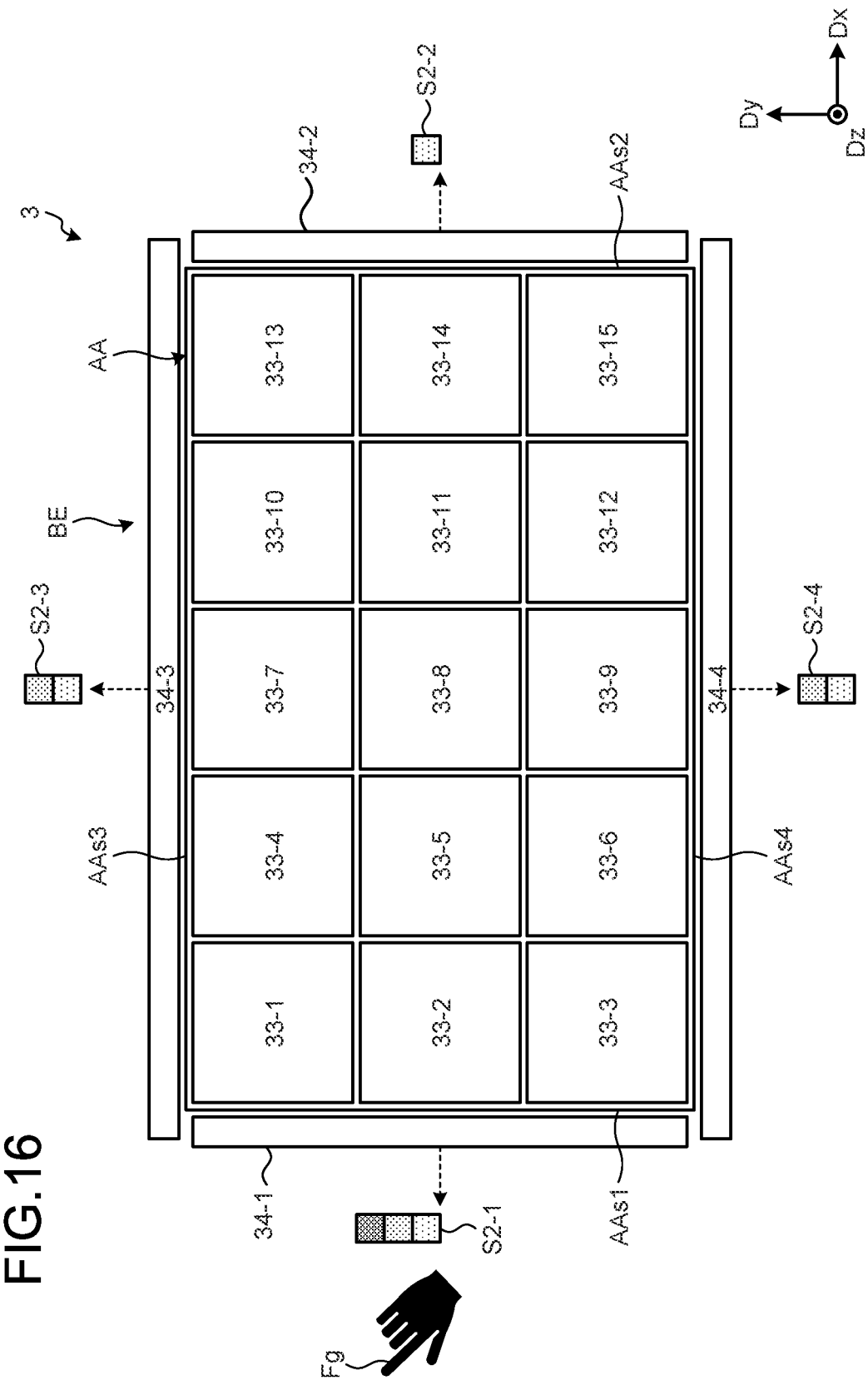
FIG. 16 is an explanatory diagram for description of a method of detecting the detection target body with a second detection electrode when the detection target body is in a peripheral region.

The following describes an exemplary method of determining whether the detection target body Fg is positioned in the detection region AA with reference to FIGS. 15 and 16. FIG. 15 is an explanatory diagram for description of a method of detecting the detection target body with a second detection electrode when the detection target body is in the detection region. FIG. 16 is an explanatory diagram for description of a method of detecting the detection target body with a second detection electrode when the detection target body is in the peripheral region.

FIGS. 15 and 16 schematically illustrate the magnitude of the detection value S2 output from each second detection electrode 34. The magnitude of the detection value S2 is, for example, a voltage value, and a larger number of blocks of the detection value S2 illustrated in FIGS. 15 and 16 indicate a larger voltage value of the detection value S2.

FIG. 15 illustrates a case in which the detection target body Fg is in the detection region AA, specifically, a case in which the detection target body Fg is in a region overlapping the first detection electrode 33-8 at the center of the detection region AA. As illustrated in FIG. 15, when the detection target body Fg is in the detection region AA, the detection values S2-1 and S2-2 from the two second detection electrodes 34-1 and 34-2 disposed with the detection target body Fg interposed therebetween in the first direction Dx have equivalent magnitudes. Similarly, the detection values S2-3 and S2-4 from the two second detection electrodes 34-3 and 34-4 disposed with the detection target body Fg interposed therebetween in the second direction Dy have equivalent magnitudes. The detection values S2-3 and S2-4 of the second detection electrodes 34-3 and 34-4 are larger than the detection values S2-1 and S2-2 of the second detection electrodes 34-1 and 34-2 in accordance with the distance to the detection target body Fg.

FIG. 16 illustrates a case in which the detection target body Fg is in the peripheral region BE, specifically, a case in which the detection target body Fg is on the outer edge side of the substrate 31 beyond the side AAs1 of the detection region AA and the second detection electrode 34-1. As illustrated in FIG. 16, when the detection target body Fg is in the peripheral region BE, the detection values S2-3 and S2-4 from the two second detection electrodes 34-3 and 34-4 disposed with the detection region AA interposed therebetween in the second direction Dy have equivalent magnitudes. However, the detection value S2-1 from the second detection electrode 34-1 at a position close to the detection target body Fg in the first direction Dx and the detection value S2-2 from the second detection electrode 34-2 at a position separated from the detection target body Fg with the detection region AA interposed therebetween have different magnitudes. The detection value S2-1 of the second detection electrode 34-1 is larger than the detection values S2-3 and S2-4 of the second detection electrodes 34-3 and 34-4 in accordance with the distance to the detection target body Fg. The detection value S2-2 of the second detection electrode 34-2 is smaller than the detection values S2-3 and S2-4 of the second detection electrodes 34-3 and 34-4.

As illustrated in FIGS. 15 and 16, distribution of the detection value S2 of the second detection electrode 34 is different depending on whether the detection target body Fg is in the detection region AA or the peripheral region BE. The deviation of the detection value S2 is small when the detection target body Fg is in the detection region AA, and the deviation of the detection value S2 is large when the detection target body Fg is in the peripheral region BE.

The detection device 3 measures distribution of the detection value S2 for each position of the detection target body Fg in advance, and the storage circuit 56 stores this distribution pattern of the detection value S2 as a table. At step ST4 illustrated in FIG. 14, the determination circuit 55 determines whether the detection target body Fg is positioned in the detection region AA through comparison with the distribution pattern of the detection value S2 of the second detection electrode 34. As described above, the detection device 3 includes the determination circuit 55 configured to determine whether the detection target body Fg is in contact or nearby based on the detection values S1 and S2 of a plurality of first detection electrodes 33 and at least one second detection electrode 34. When the detection value S2 of the second detection electrode 34 has the maximum value among the detection values S1 and S2 of the plurality of first detection electrodes 33 and the at least one second detection electrode 34, the determination circuit 55 determines that the detection target body Fg is in the peripheral region BE.

In FIGS. 15 and 16, whether the detection target body Fg is in the detection region AA is determined based on the detection value S2 of a second detection electrode 34, but the present disclosure is not limited thereto. Whether the detection target body Fg is in the detection region AA may be determined by using not only the detection value S2 of the second detection electrode 34 but also the detection value S1 of a first detection electrode 33.

In FIG. 14, when the detection target body Fg is not in the detection region AA (No at step ST4), the detection device 3 determines that no input operation is performed by the detection target body Fg, and repeatedly executes the touch detection at step ST2.

When the detection target body Fg is in the detection region AA (Yes at step ST4), the detection device 3 determines that an input operation is performed by the detection target body Fg. The first coordinate calculation circuit 52 detects the peak position of the detection values S1 of the plurality of first detection electrodes 33 (step ST5). At step ST5, schematic position information of the detection target body Fg is obtained from information of the peak position of the detection values S1, and height information of the detection target body Fg is obtained from the magnitude of the peak detection value S1.

The determination circuit 55 determines whether the peak position of the detection values S1 calculated by the first coordinate calculation circuit 52 is on the outer edge side of the detection region AA based on the information of the peak position (step ST6). When the peak position is on the outer edge side of the detection region AA (Yes at step ST6), the determination circuit 55 determines the peak position of the detection values S1 in more detail to select a correction-targeted second detection electrode 34.

Specifically, the determination circuit 55 determines whether the peak position of the detection values S1 is on the outer edge side of the detection region AA in the first direction Dx (step ST7). When the peak position of the detection values S1 is on the outer edge side of the detection region AA in the first direction Dx (Yes at step ST7), for example, when the peak position of the detection values S1 is at any of the first detection electrodes 33-1, 33-2, 33-3, 33-13, 33-14, and 33-15 in the example illustrated in FIG. 4, the correction circuit 53 corrects the detection value S2 of the second detection electrode 34-1 or the second detection electrode 34-2 (step ST8).

When the peak position of the detection values S1 is not on the outer edge side of the detection region AA in the first direction Dx (No at step ST7), the correction circuit 53 does not correct the detection values S2 of the second detection electrodes 34-1 and 34-2.

Subsequently, the determination circuit 55 determines whether the peak position of the detection values S1 is on the outer edge side of the detection region AA in the second direction Dy (step ST9). When the peak position of the detection values S1 is on the outer edge side of the detection region AA in the second direction Dy (Yes at step ST9), for example, when the peak position of the detection values S1 is at any of the first detection electrodes 33-1, 33-4, 33-7, 33-10, 33-13, 33-3, 33-6, 33-9, 33-12, and 33-15 in the example illustrated in FIG. 4, the correction circuit 53 corrects the detection value S2 of the second detection electrode 34-3 or the second detection electrode 34-4 by using, for example, the correction table illustrated in FIG. 13 (step ST10).

When the peak position of the detection values S1 is not on the outer edge side of the detection region AA in the second direction Dy (No at step ST9), the correction circuit 53 does not correct the detection values S2 of the second detection electrodes 34-3 and 34-4.

The second coordinate calculation circuit 54 extracts the detection values S1 of a plurality of first detection electrodes 33 adjacent to a first detection electrode 33 at the peak position and the detection value S2 of at least one second detection electrode 34 adjacent to the first detection electrode 33 at the peak position (step ST11). The second coordinate calculation circuit 54 calculates the position of the detection target body Fg based on the plurality of detection values S1 extracted at step ST11 and the corrected detection value S2 (step ST12). In this manner, when the detection target body Fg is on the outer edge side of the detection region AA, the second coordinate calculation circuit 54 calculates the position of the detection target body Fg by using the corrected detection value S2. Specifically, the second coordinate calculation circuit 54 can accurately detect the position of the detection target body Fg in a first detection electrode 33 indicating the peak detection value S1 by calculating distribution of the detection value S1 and the corrected detection value S2 across a plurality of first detection electrodes 33 and at least one second detection electrode 34.

At step ST6, when the peak position of the detection values S1 is not on the outer edge side of the detection region AA (No at step ST6), in other words, when the peak position of the detection values S1 is at the central part of the detection region AA, the correction circuit 53 does not perform the correction of the detection value S2 of the second detection electrode 34 at steps ST7 to ST10.

The second coordinate calculation circuit 54 extracts the detection values S1 of the plurality of first detection electrodes 33 adjacent to the first detection electrode 33 at the peak position (step ST11). The second coordinate calculation circuit 54 calculates the position of the detection target body Fg based on the plurality of detection values S1 extracted at step ST11 (step ST12). Accordingly, the second coordinate calculation circuit 54 can accurately detect the position of the detection target body Fg in a first detection electrode 33 indicating the peak detection value S1 by calculating distribution of the detection value S1 across a plurality of first detection electrodes 33.

The detection method illustrated in FIG. 14 is merely exemplary and may be modified as appropriate. For example, the pair of steps ST7 and ST8 and the pair of steps ST9 and ST10 may be performed in the opposite order. Moreover, the pair of steps ST7 and ST8 and the pair of steps ST9 and ST10 are separated to simplify description, but these pairs of steps may be simultaneously performed.

First Modification

Figure 17:
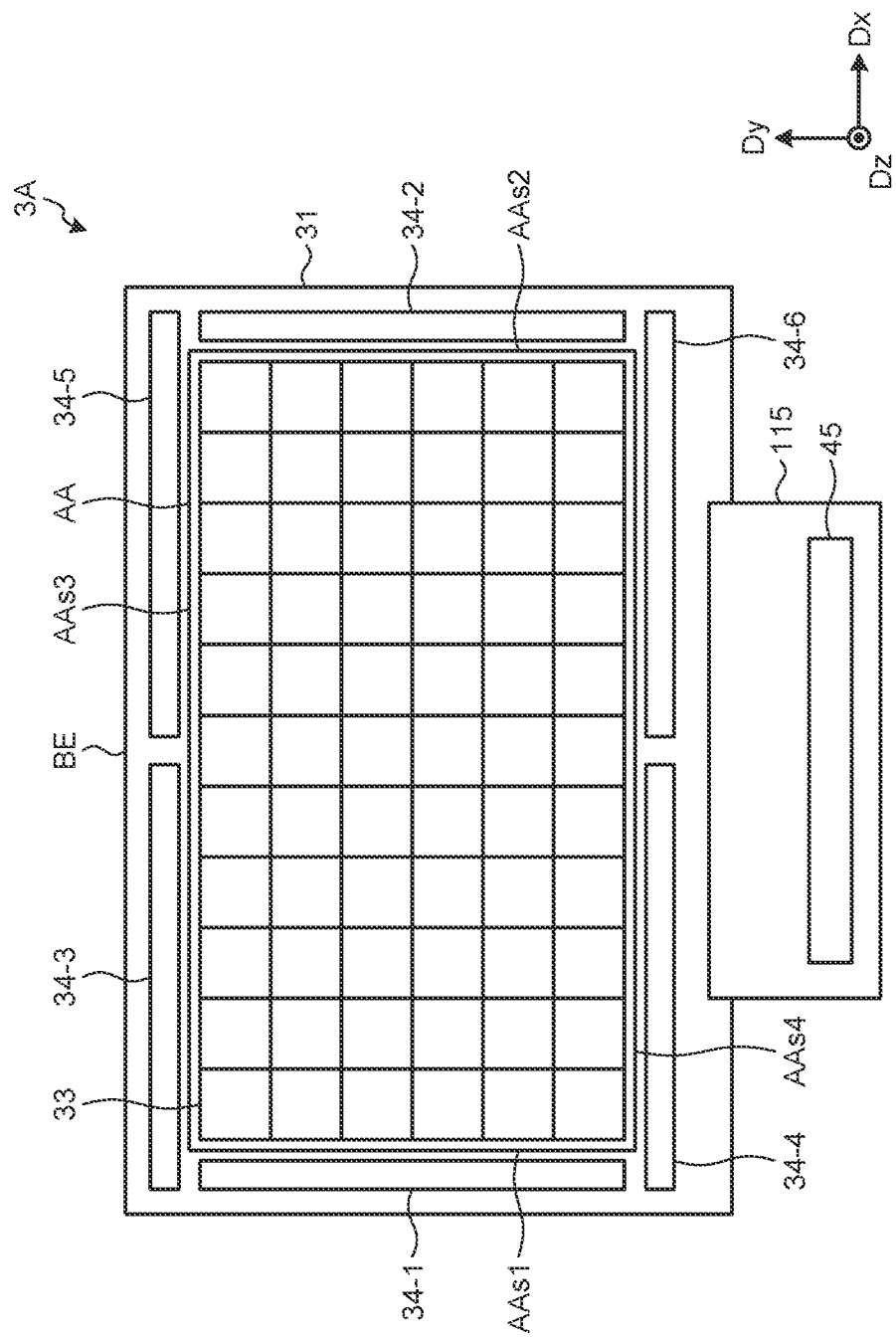
FIG. 17 is a plan view schematically illustrating a detection device according to a first modification.

FIG. 17 is a plan view schematically illustrating a detection device according to a first modification. In the following description, any constituent component same as that described above in the embodiment is denoted by the same reference sign and duplicate description thereof is omitted.

As illustrated in FIG. 17, in a detection device 3A according to the first modification, six second detection electrodes 34 are disposed around the detection region AA and a plurality of first detection electrodes 33. Specifically, a second detection electrode 34-3 and a second detection electrode 34-5 are disposed alongside in the first direction Dx along the side AAs3 of the detection region AA. The second detection electrodes 34-3 and 34-5 are separately disposed with a slit interposed therebetween. Similarly, a second detection electrode 34-4 and a second detection electrode 34-6 are disposed alongside in the first direction Dx along the side AAs4 of the detection region AA. The second detection electrodes 34-4 and 34-6 are separately disposed with a slit interposed therebetween. The detection region AA and the plurality of first detection electrodes 33 are disposed between each of the second detection electrodes 34-3 and 34-5 and the corresponding one of the second detection electrodes 34-4 and 34-6 adjacent thereto in the second direction Dy. Second detection electrodes 34-1 and 34-2 are the same as in the above-described embodiment, and thus duplicate description thereof is omitted.

Second Modification

Figure 18:
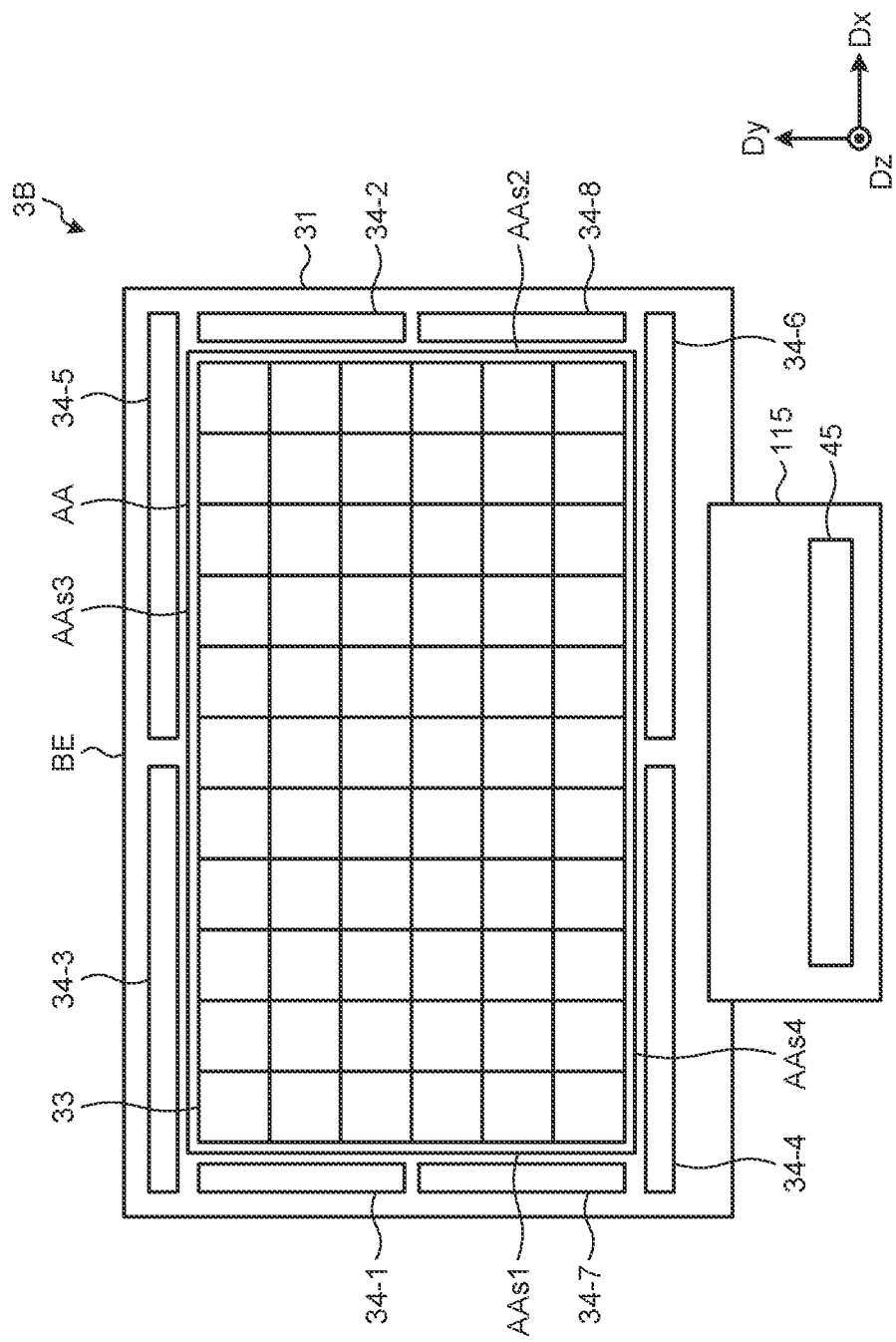
FIG. 18 is a plan view schematically illustrating a detection device according to a second modification.

FIG. 18 is a plan view schematically illustrating a detection device according to a second modification. As illustrated in FIG. 18, in a detection device 3B according to the second modification, eight second detection electrodes 34 are disposed around the detection region AA and a plurality of first detection electrodes 33.

Specifically, a second detection electrode 34-1 and a second detection electrode 34-7 are disposed alongside in the second direction Dy along the side AAs1 of the detection region AA. The second detection electrodes 34-1 and 34-7 are separately disposed with a slit interposed therebetween. Similarly, a second detection electrode 34-2 and a second detection electrode 34-8 are disposed alongside in the second direction Dy along the side AAs2 of the detection region AA. The second detection electrodes 34-2 and 34-8 are separately disposed with a slit interposed therebetween. The detection region AA and the plurality of first detection electrodes 33 are disposed between each of the second detection electrodes 34-1 and 34-7 and the corresponding one of the second detection electrodes 34-2 and 34-8 adjacent thereto in the first direction Dx. The second detection electrodes 34-3, 34-4, 34-5, and 34-6 are the same as in the first modification, and thus duplicate description thereof is omitted.

As described in the first and second modifications, it is possible to accurately correct the detection value S2 of a second detection electrode 34 by increasing the number of second detection electrodes 34 (increasing the number of divisions), thereby improving the accuracy of detection on the outer edge side of the detection region AA. Moreover, in the first and second modifications as well, the number of second detection electrodes 34 may be increased as long as the time constant of the plurality of second detection electrodes 34 is equivalent to the time constant of the plurality of first detection electrodes 33.

Third Modification

Figure 19:
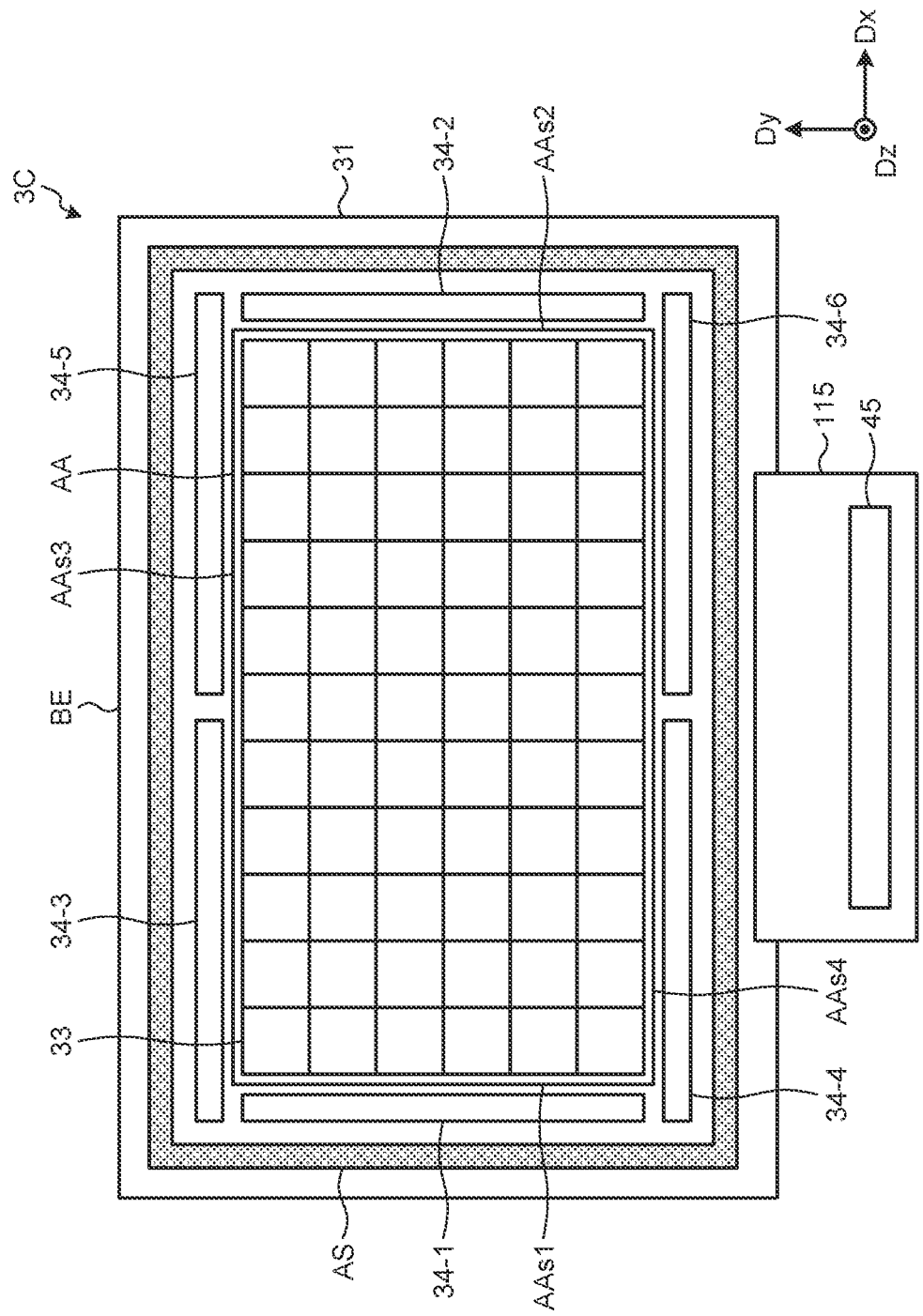
FIG. 19 is a plan view schematically illustrating a detection device according to a third modification.

FIG. 19 is a plan view schematically illustrating a detection device according to a third modification. As illustrated in FIG. 19, this detection device 3C according to the third modification additionally includes a shield electrode AS. The shield electrode AS is provided around a plurality of first detection electrodes 33 and a plurality of second detection electrodes 34 in the peripheral region BE on the substrate 31. In the example illustrated in FIG. 19, the shield electrode AS is formed in one continuous frame shape. However, the present disclosure is not limited thereto, and the shield electrode AS may be provided with a slit or the like at a part or may be divided into a plurality of shield electrodes AS.

The shield electrode AS is supplied with a signal having the same phase as drive signals supplied to the plurality of first detection electrodes 33 and the plurality of second detection electrodes 34. The shield electrode AS is also supplied with a signal having the same amplitude as drive signals supplied to the plurality of first detection electrodes 33 and the plurality of second detection electrodes 34. Accordingly, it is possible to prevent parasitic capacitance formed at the plurality of first detection electrodes 33 and the plurality of second detection electrodes 34.

Preferable embodiments of the present disclosure are described above, but the present disclosure is not limited to such embodiments. Contents disclosed in the embodiments are merely exemplary, and various kinds of modifications are possible without departing from the scope of the present disclosure. Any modification performed as appropriate without departing from the scope of the present disclosure belongs to the technical scope of the present disclosure. At least one of various kinds of omission, replacement, and change of constituent components may be performed without departing from the scope of the embodiment and modifications described above.

What is claimed is:

1. A detection device comprising:
   a plurality of first detection electrodes disposed in a matrix of rows and columns in a detection region of a substrate;
   at least one second detection electrode disposed in a peripheral region outside the detection region, positioned adjacent to some of the plurality of the first detection electrodes, and provided along a side of the detection region; and
   a coordinate calculation circuit configured to calculate a detection position of a detection target body, wherein
   when any of the first detection electrodes is disposed between a first detection electrode indicating a maximum detection value among the first detection electrodes and a side closest to the first detection electrode indicating the maximum detection value among sides of the detection region, the coordinate calculation circuit calculates the detection position of the detection target body based on the detection value of the first detection electrode indicating the maximum detection value and detection values of some first detection electrodes adjacent to the first detection electrode indicating the maximum detection value, among the plurality of first detection electrodes, and
   when the first detection electrode indicating the maximum detection value is disposed on an outer edge side of the detection region, the coordinate calculation circuit calculates the detection position of the detection target body based on the detection value of the first detection electrode indicating the maximum detection value, a detection value of the at least one second detection electrode adjacent to the first detection electrode indicating the maximum detection value, and detection values of some first detection electrodes adjacent to the first detection electrode indicating the maximum detection value, among the plurality of first detection electrodes.

2. The detection device according to claim 1, wherein the plurality of first detection electrodes and the at least one second detection electrode each output a detection signal in accordance with change in self-capacitance of the detection electrode.

3. The detection device according to claim 1, wherein a width of the second detection electrode is shorter than a width of each of the first detection electrodes in a direction intersecting an extension direction of the second detection electrode.

4. The detection device according to claim 1, wherein a time constant of the at least one second detection electrode is equivalent to a time constant of each of the plurality of first detection electrodes in effect.

5. The detection device according to claim 1, further comprising a shield electrode provided in the peripheral region and surrounding outside of the plurality of first detection electrodes and the at least one second detection electrode.

6. The detection device according to claim 5, wherein the shield electrode is supplied with a signal having the same phase as signals to the plurality of first detection electrodes and the at least one second detection electrode.

7. The detection device according to claim 5, wherein the shield electrode is supplied with a signal having the same amplitude as signals to the plurality of first detection electrodes and the at least one second detection electrode.

8. The detection device according to claim 1, further comprising a storage circuit configured to store a first correction value in accordance with sensitivity of the at least one second detection electrode, wherein the coordinate calculation circuit calculates the detection position of the detection target body based on a value obtained by multiplying the detection value of the at least one second detection electrode by the first correction value.

9. The detection device according to claim 8, wherein the first correction value is determined based on an average value of a first correction amount of the detection value of the second detection electrode when the detection target body is positioned at a central part of a first detection electrode adjacent to the second detection electrode among the first detection electrodes and a second correction amount of the detection value of the second detection electrode when the detection target body is positioned in a region between the second detection electrode and the first detection electrode.

10. The detection device according to claim 8, wherein
    the first correction value is different for each height of the detection target body, and
    the storage circuit stores, as a correction table of the second detection electrode, the relation between the height of the detection target body and the first correction value.

11. The detection device according to claim 8, wherein
    the at least one second detection electrode extends along the side of the detection region, and
    the storage circuit stores a second correction value of the detection value of the second detection electrode in accordance with the position of the detection target body in an extension direction of the second detection electrode.

12. The detection device according to claim 11, wherein the second correction value is different for each height of the detection target body, and
the storage circuit stores, as a correction table of the second detection electrode, the relation between the height of the detection target body and the second correction value.

13. The detection device according to claim 1, further comprising a determination circuit configured to determine whether the detection target body is in contact or nearby based on the detection values of the plurality of first detection electrodes and the at least one second detection electrode, wherein the determination circuit determines that the detection target body is in the peripheral region when the detection value of the second detection electrode is maximum among the detection values of the plurality of first detection electrodes and the at least one second detection electrode.

14. A detection device comprising:
a plurality of first detection electrodes disposed in a matrix of rows and columns in a detection region of a substrate; and
at least one second detection electrode disposed in a peripheral region outside the detection region, positioned adjacent to some of the plurality of first detection electrodes, and provided along a side of the detection region,
wherein when a first detection electrode indicating a maximum detection value among the plurality of first detection electrodes is disposed on an outer edge side of the detection region, a detection position of the detection target body is calculated based on the detection value of the first detection electrode indicating the maximum detection value, a detection value of the at least one second detection electrode adjacent to the first detection electrode indicating the maximum detection value, and detection values of some first detection electrodes adjacent to the first detection electrode indicating the maximum detection value, among the plurality of first detection electrodes.

15. The detection device according to claim 14, wherein a width of the second detection electrode is shorter than a width of each of the first detection electrodes in a direction intersecting an extension direction of the second detection electrode.

* * * * *